(12) United States Patent
Oh et al.

(10) Patent No.: US 11,039,001 B2
(45) Date of Patent: Jun. 15, 2021

(54) METHOD FOR SUPPORTING VOICE CALLS IN COMMUNICATION TERMINAL

(71) Applicant: Samsung Electronics Co., Ltd., Suwon-si (KR)

(72) Inventors: Gyu-Bong Oh, Suwon-si (KR); Jong-Hyun Jin, Seongnam-si (KR); Han-Il Yu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/775,248

(22) PCT Filed: Nov. 10, 2016

(86) PCT No.: PCT/KR2016/012951
§ 371 (c)(1),
(2) Date: May 10, 2018

(87) PCT Pub. No.: WO2017/082657
PCT Pub. Date: May 18, 2017

(65) Prior Publication Data
US 2018/0343336 A1 Nov. 29, 2018

(30) Foreign Application Priority Data
Nov. 10, 2015 (KR) .................. 10-2015-0157752

(51) Int. Cl.
*H04M 1/72439* (2021.01)
*H04M 1/57* (2006.01)

(52) U.S. Cl.
CPC ........ *H04M 1/72439* (2021.01); *H04M 1/575* (2013.01)

(58) Field of Classification Search
CPC ......... H04M 3/42059; H04M 3/42042; H04M 3/42093; H04M 1/72439; H04M 1/575;
(Continued)

(56) References Cited

U.S. PATENT DOCUMENTS 9,172,795 B1* 10/2015 Rathod ............. H04M 3/42042
2003/0092432 A1* 5/2003 Hwang ................. H04M 15/06
455/415
(Continued)

FOREIGN PATENT DOCUMENTS

| CN | 101228517 A | 7/2008 |
| CN | 101540970 A | 9/2009 |

(Continued)

OTHER PUBLICATIONS

Chinese Office Action dated Jan. 3, 2020, issued in Chinese Application No. 201680065580.X.
(Continued)

*Primary Examiner* — Fred A Casca
(74) *Attorney, Agent, or Firm* — Jefferson IP Law, LLP

(57) ABSTRACT

Disclosed in various examples is a method for supporting voice calls linked with message provision in a communication terminal. To this end, additional information is transmitted to a counterpart communication terminal by a voice call request to the counterpart communication terminal, and after the additional information is transmitted, the counterpart communication terminal is called in response to the transmitted additional information. The additional information includes information on at least one message selected from among messages transmitted to the counterpart communication terminal or being received from the counterpart communication terminal and stored.

17 Claims, 12 Drawing Sheets

(58) Field of Classification Search
CPC ......... H04M 1/72436; H04M 2250/60; H04W 76/10; H04W 24/10; H04W 4/70
See application file for complete search history.

(56) References Cited

U.S. PATENT DOCUMENTS

| | | | | |
|---|---|---|---|---|
| 2003/0190025 | A1* | 10/2003 | Okamura | H04M 1/2745 379/142.17 |
| 2007/0036284 | A1 | 2/2007 | Raghav et al. | |
| 2010/0329438 | A1* | 12/2010 | Yang | H04Q 3/0025 379/142.01 |
| 2014/0119526 | A1 | 5/2014 | Yerli | |
| 2014/0324414 | A1* | 10/2014 | Zhang | G06F 17/2765 704/9 |
| 2014/0344749 | A1 | 11/2014 | Choi et al. | |
| 2014/0357239 | A1 | 12/2014 | Ko | |
| 2015/0117444 | A1 | 4/2015 | Sandblad et al. | |
| 2016/0034127 | A1* | 2/2016 | Seo | G06F 3/04883 715/769 |
| 2016/0142533 | A1* | 5/2016 | Yoo | H04M 1/575 455/567 |

FOREIGN PATENT DOCUMENTS

| | | |
|---|---|---|
| CN | 103780772 A | 5/2014 |
| CN | 104182168 A | 12/2014 |
| KR | 10-2001-0100152 A | 11/2001 |
| KR | 10-2009-0077259 A | 7/2009 |
| KR | 10-2013-0068044 A | 6/2013 |
| KR | 10-1340157 B1 | 12/2013 |

OTHER PUBLICATIONS

Chinese Office Action dated Oct. 22, 2020, Issued in Chinese Application No. 201680065580.X.

\* cited by examiner (a)          (b)

(a)          (b)

METHOD FOR SUPPORTING VOICE CALLS IN COMMUNICATION TERMINAL

CROSS-REFERENCE TO RELATED APPLICATION(S)

This application is a National Phase Entry of PCT International Application No. PCT/KR2016/012951, which was filed on Nov. 10, 2016, and claims priority to Korean Patent Application No. 10-2015-0157752, which was filed on Nov. 10, 2015, the contents of which are incorporated herein by reference.

TECHNICAL FIELD

Various embodiments of the present disclosure relate to a method for supporting a voice call in connection with providing of a message in a communication terminal.

BACKGROUND ART

A typical communication terminal provides a representative service of exchanging messages with other communication terminals in addition to supporting voice calls. It has been common for communication terminals to exchange messages and support voice calls independently.

Therefore, in the case where a user cannot receive a response message to a message transmitted to a counterpart communication terminal although the user has transmitted the message using a communication terminal, it is common for the user to attempt to make a voice call using the communication terminal.

In this case, after the voice call is connected, the user may verbally describe the purpose for calling and continue the relevant conversation. In this case, if a user has already sent information about the purpose for calling to a counterpart through a message, it is inconvenient to describe the same content again for the counterpart.

DETAILED DESCRIPTION OF THE INVENTION

Technical Problem

An embodiment of the present disclosure may provide a method for transferring additional information related to a voice call to a counterpart communication terminal by a communication terminal when a voice call is made to the counterpart communication terminal, and a device therefor.

An embodiment of the present disclosure may provide a method for receiving additional information relating to a voice call from a counterpart communication terminal by a communication terminal when the voice call is made to the counterpart communication terminal, and a device therefor.

Technical Solution

A method for supporting a voice call by a communication terminal to a counterpart communication terminal according to various embodiments of the present disclosure may include the procedures of: transmitting additional information to a counterpart communication terminal in the event of a voice call request to the counterpart communication terminal; and after transmitting the additional information, calling the counterpart communication terminal according to the transmitted additional information, wherein the additional information includes information relating to at least one message selected among from messages transmitted to the counterpart communication terminal.

A method for supporting a voice call by a communication terminal according to various embodiments of the present disclosure may include the procedures of: receiving additional information from a counterpart communication terminal; confirming a level that is set for the counterpart communication terminal, and configuring display information corresponding to the confirmed level on the basis of the additional information; displaying the configured display information; and connecting a voice call in response to a call from the counterpart communication terminal corresponding to the displayed display information, wherein the additional information includes information relating to at least one message selected from among messages transmitted by the counterpart communication terminal.

According to various embodiments of the present disclosure, a caller and a call receiver can share a purpose for calling during a voice call, and a smooth conversation can be thus achieved between the caller and the call receiver. This may also reduce the amount of traffic caused by a call time of a voice call and the like.

BRIEF DESCRIPTION OF DRAWINGS

The above and other aspects, features and advantages of the present disclosure will be more apparent from the following detailed description taken in conjunction with the accompanying drawings, in which.

MODE FOR CARRYING OUT THE INVENTION

Figure 1:
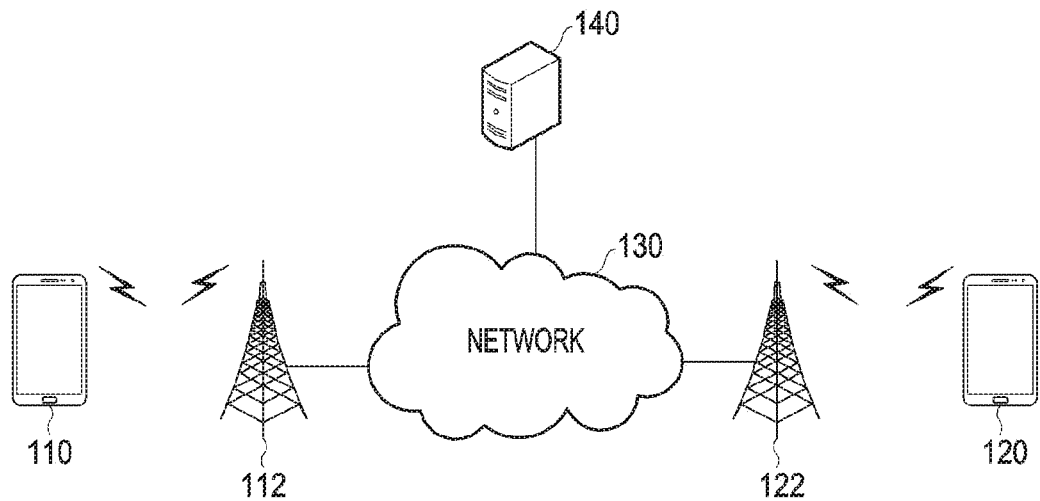
FIG. 1 is a diagram illustrating an example of a network configuration according to proposed various embodiments.

Hereinafter, various embodiments of the present disclosure will be described with reference to the accompanying drawings. However, it should be understood that there is no intent to limit the present disclosure to particular forms, and the present disclosure should be construed as covering all modifications, equivalents, and/or alternatives falling within the spirit and scope of the embodiments of the present disclosure. In describing the drawings, similar reference numerals may be used to designate similar constituent elements.

In the present disclosure, the expression "have" or "may have", "include" or "may include", or the like refers to the presence of a corresponding feature (e.g., numerical values, functions, operations, or elements, such as parts, etc.), but the presence of additional features is not excluded.

In the present disclosure, the expression "A or B", "at least one of A or/and B", or "one or more of A or/and B" may include all possible combinations of the items listed. For example, "A or B," "at least one of A and B", or "at least one of A or B" may refer to all cases of (1) including at least one A, (2) including at least one B, or (3) including both at least one A and at least one B.

The expressions "primary", "secondary", "first", or "second" etc. used in various embodiments may modify various elements regardless of their order and/or importance, and do not limit the corresponding elements. The above-described expressions may be used to distinguish an element from another element. For example, a first user device and a second user device may indicate different user devices although both of them are user devices. For example, a first element may be termed a second element, and similarly, a second element may be termed a first element without departing from the scope of the present disclosure.

It should be understood that when an element (e.g., a first element) is referred to as being (operatively or communicatively) "connected", or "coupled", to another element (e.g., a second element), it may be directly connected or coupled directly to the other element or some other element (e.g., a third element) may be interposed therebetween. In contrast, it may be understood that when an element (e.g., a first element) is referred to as being "directly connected", or "directly coupled" to another element (a second element), there is no element (e.g., a third element) interposed therebetween.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) exclusively for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in context. Unless defined otherwise, all terms used herein, including technical terms and scientific terms, may have the same meanings as those commonly understood by a person of ordinary skill in the art to which the present disclosure pertains. Such terms as those defined in a generally used dictionary are to be interpreted as having the meanings equal to the contextual meanings in the relevant field of the art, and are not to be interpreted as having ideal or excessively formal meanings unless clearly defined in the present disclosure. In some cases, even a term defined in the present disclosure should not be interpreted to exclude embodiments of the present disclosure.

In various embodiments proposed in the present disclosure, a solution may be provided for enabling a transmission terminal and a reception terminal to share additional information related to a purpose for calling during a voice call, and enabling a call receiver to confirm a voice call through the reception terminal before the call is made. Hereinafter, for convenience of description, a term "a message-linked call" will be used to indicate a voice call which shares additional information in advance. The additional information may be transferred to the reception terminal by the transmission terminal before making a call request for a message-linked call.

It may be desirable to define the additional information so that a call receiver can easily recognize a caller's purpose for calling. For example, the additional information may include information relating to a calling-purpose-related message (hereinafter, referred to as "message-related information").

The message-related information may be a calling-purpose-related message or identification information (hereinafter, referred to as "message identification information") that indicates the calling-purpose-related message. In addition, if information can be used by the reception terminal to acquire the calling-purpose-related message, the information may be able to be used as the message-related information.

The calling-purpose-related message may be at least one message that meets the purpose of a message-linked call from among target messages. The target messages may be messages stored in a transmitted message storage box and/or a received message storage box of a communication terminal, or may be messages transceived with a counterpart communication terminal, to which the communication terminal is to attempt to make a message-linked call, among the stored messages. The transmitted message storage box is a storage box that stores messages received from another communication terminal by the communication terminal, and the received message storage box is a message storage box that stores messages transmitted to another communication terminal by the communication terminal.

According to an embodiment, a message that meets the purpose of a message-linked call is likely to be a message transceived with a counterpart communication terminal to which a communication terminal is to attempt to make a message-linked call. Therefore, at the time of selecting a message meeting the purpose of the message-linked call, it may be desirable to select the message from among target messages. The target messages may be limited to messages transmitted to a reception terminal by a transmission terminal.

The additional information may include information relating to an emoticon that can efficiently express the state of a caller to a call receiver. The information relating to the emoticon may include the corresponding emoticon or identification information (hereinafter, referred to as "emoticon identification information") that indicates the corresponding emoticon. That is, if information can be used for acquiring a message to be provided by the transmission terminal, the information may be able to be used as the information relating to the emoticon. In addition, the additional information may further include information relating to at least one among a call subject, a picture, a location, a schedule, a media file, and an application file.

As one example, additional information may be initially set for the communication terminal according to a basic value. That is, the communication terminal may provide a basic value of an emoticon, a call subject, a picture, a location, a schedule, a media file, an application, and the like, which may be used as additional information. A user may be able to modify most information that may be used as initial or current additional information. Therefore, the user may configure additional information to be used for call connection, by using the set information.

However, a message-linked call in various embodiments proposed in the present disclosure may be able to be implemented not only by sharing a message, but also by sharing an emoticon. That is, for a message-linked call, a transmission terminal may transfer an emoticon that implies a purpose for calling to a reception terminal before making a call attempt. Even in this case, a call receiver may be able to recognize the purpose of the call being received in advance. This may correspond to an emoticon-linked call, but in the following description, the term "message-linked call" is to be understood as including an emoticon-linked call.

In addition, a user may preset a transmitting call preference to be considered for determining whether or not to provide additional information by the communication terminal for each counterpart communication terminal (registered phone number), or may change an existing setting. Further, the communication terminal may preset an incoming call preference corresponding to an incoming call or may change an existing setting, for each counterpart communication terminal. The communication terminal may determine whether to attempt to make a message-linked call or a normal call to the counterpart communication terminal in consideration of a set transmitting call preference. To this end, the communication terminal may set a message-linked transmission mode or a message-linked reception mode for each registered phone number. The message-linked transmission mode is a call mode that allows an attempt to make a message-linked call to a communication terminal corresponding to a corresponding phone number, and the message-linked reception mode is a call mode that allows a message-linked call by a communication terminal corresponding to a corresponding phone number.

Further, the communication terminal may set or determine whether to accept all, a part, or none of the message-linked call from the counterpart communication terminal in consideration of the incoming call preference. Accepting all of the message-linked call information means approving provision of the user with all of the additional information pertaining to the message-linked call in order to figure out the purpose for calling, and accepting some of the message-linked call information means approving providing the user with only some of the entire additional information in order to figure out the purpose for calling. Accepting none of the message-linked call may allow only a normal call which does not provide any additional information. To this end, the communication terminal may set a level for the message-linked call for each registered phone number. For example, a contact group for classification of registered phone numbers may be used for the level. The contact group may be classified into family members, friends, co-workers, business partners, or the like, and further classification may be added as necessary.

In various embodiments proposed in the present disclosure, when a message-linked call is made, a transmission terminal and a reception terminal may perform bidirectional communication for the purpose of updating additional information shared therebetween, adding new information, or the like. Updating of the additional information may include eliminating information constituting existing additional information and replacing the information with other information. For example, the additional information shared between the transmission terminal and the reception terminal may be updated or new information may be added thereto in consideration of the voice call content. Updating the additional information or adding new information is not restrictedly available for the transmission terminal or the reception terminal. That is, it may be possible for any one of the transmission terminal and the reception terminal to update the additional information or add new information.

In various embodiments proposed in the present disclosure, it is to be proposed that the reception terminal rejects an attempt to make a message-linked call by using a real-time text (RTT) function, in response to the attempt to make the message-linked call by the transmission terminal. For example, the reception terminal may transfer text having content that does not allow a call, to the transmission terminal on the basis of the RTT function in response to a message-linked call request. For reference, the RTT function refers to a service for transferring text input by the reception terminal to the transmission terminal in real time.

In various embodiments proposed in the present disclosure, the transmission terminal and the reception terminal may both store a call record according to a message-linked call. At this time, the message-linked call is not necessarily required to be connected. That is, regardless of whether or not the message-linked call is connected, the additional information shared between the transmission terminal and the reception terminal for the message-linked call may be stored as a call record. In this case, the transmission terminal or the reception terminal may use the stored call record for the subsequent message-linked call. The additional information stored as the call record may be modified by the transmission terminal or the reception terminal through editing thereof, etc. when a subsequent message-linked call is made.

The message-linked call according to various embodiments proposed in the present disclosure may be applied regardless of whether or not the internet protocol (IP) is supported. For example, when the message-linked call is based on the IP, transferring of additional information or a voice call connection may be implemented by connecting a session between the transmission terminal and the reception terminal. Further, when the IP is not supported, it may be implemented that the transmission terminal performs instruction to a specific server, and the specific server provides additional information to the reception terminal according to the instruction.

Hereinafter, various embodiments to be proposed will be described in detail with reference to accompanying drawings.

FIG. 1 is a diagram illustrating an example of a network configuration according to proposed various embodiments. In consideration of the convenience of description, FIG. 1 illustrates only a minimum configuration for various embodiments. However, it may be possible to add, as necessary, a terminal, a server, or the like in order to implement various embodiments to be proposed in the present disclosure. Further, although it has been assumed that a communication terminal supports a wireless communication, if the communication terminal can transmit/receive texts, images, and the like, and supports a voice call service, proposed various embodiments can be applied regardless of a communication scheme supported thereby.

Referring to FIG. 1, a first communication terminal 110 and a second communication terminal 120 may be able to access a network 130 through a base station 112 or 122. The first communication terminal 110 and the second communication terminal 120 may access a server 140 via the network 130. The server 140 may be different depending on the type of a communication service used by the first and second communication terminals 110 and 120. For example, the server 140 may be a server that supports a message transmission service between communication terminals. Alternatively, when the terminals belong to different networks, that is, belong to different service providers, different servers may also be used to provide a service. In the following description, for convenience of understanding, the first communication terminal 110 is assumed to be a transmission terminal and the second communication terminal 120 is assumed to be the reception terminal.

The transmission terminal is a communication terminal that attempts to make a message-linked call using a transmitted or received message for a voice call, and the reception terminal is a communication terminal that provides a message-linked call in response to a request made by the transmission terminal. The reception terminal may be informed of the purpose of the voice call that the transmission terminal attempts to make by the message-linked call.

According to an embodiment, the first communication terminal 110 may transfer additional information, which may be helpful for a call receiver to predict a purpose of a voice call, to the second communication terminal 120 before or during a call attempt. The first communication terminal 110 may configure the additional information by using information which may be helpful for the call receiver using the second communication terminal 120 to recognize the purpose for calling.

The additional information may include message-related information. The message-related information refers to information relating to at least one message (hereinafter, referred to as a "selected message") selected from among target messages. The target messages may include a message (hereinafter, referred to as a "transmitted message"), stored after being transmitted to the second communication terminal 120 by the first communication terminal 110, a message (hereinafter, referred to as a "received message") stored after being received from the second communication terminal 120, or both the transmitted message and the received message. The target messages may not be limited to messages transmitted and received by the second communication terminal 120, and may extend to messages transmitted and received by all communication terminals or some communication terminals. It may be preferable to select the selected message from among the target messages in consideration of the purpose for calling. Here, the message may include all of text, images, media files, and the like.

The message-related information may include at least one selected message, or may be message identification information which indicates the at least one selected message. The message identification information may be used to differentiate the selected message from the target messages, or to acquire the selected message from a message server.

When the message identification information is used to acquire the selected message from the target messages, the message identification information may be required to be equally shared between the transmission terminal and the reception terminal. In order to share the message identification information, the transmission terminal or the reception terminal may include the message identification information when transmitting a message. In this case, the transmission terminal or the reception terminal may store the received message in accordance with the message identification information.

When the message identification information is used to acquire the selected message from the message server, the message identification information may refer to information indicating a location in the message server, at which the selected message is recorded. For example, the message identification information may be defined by a uniform resource locator (URL).

The additional information may include information relating to an emoticon. In addition, the additional information may further include information relating to at least one among a call subject or a specific event-related picture, a location, a media file, and an application file.

The information relating to the emoticon may directly include an emoticon selected for requesting a message-linked call, or may further include emoticon identification information indicating the selected emoticon. For example, the emoticon identification information may indicate one of emoticons used by a specific message application or may indicate one of emoticons provided by a server that supports a message service.

The first communication terminal 110 may set additional information for a message-linked call in advance, and may selectively use the set additional information when needed. In addition, it may also be possible to set information having a low possibility of change among the additional information in advance, and to input information having a high possibility of change at the time of attempting the message-linked call. For example, an emoticon corresponding to a counterpart communication terminal may be set in advance, and a call subject, a picture, a location, a media file, an application file, and the like may be selectively input at the time of attempting the message-linked call.

The first communication terminal 110 may transmit additional information to the second communication terminal 120 only in the situation where a message-linked call to the second communication terminal 120 is possible. The situation where the message-linked call is possible may refer to the time at which a message-linked transmission mode allowing transmission of the message-linked call is set for the first communication terminal 110 on the basis of the additional information, and a message-linked reception mode allowing reception of the message-linked call may be set for the second communication terminal 120 on the basis of the additional information.

The first communication terminal 110 may perform a procedure for confirming whether the second communication terminal 120 supports the message-linked reception mode or whether the message-linked reception mode is activated. The first communication terminal 110 may inquire of the second communication terminal 120 whether the second communication terminal 120 supports the message-linked reception mode, and may confirm whether to support the message-linked reception mode on the basis of the response of the second communication terminal 120.

When the message-linked call to the second communication terminal 120 is possible, the first communication terminal 110 may connect the second communication terminal 120 with a session for transferring the additional information. For example, the first communication terminal 110 may request session connection from the second communication terminal 120, and the session connection may be established with the permission of the second communication terminal 120, having responded to the request. For example, when configuring a message for requesting the session connection, the first communication terminal 110 may include a function tag (feature tag) indicating that the session connection is for the message-linked call. When the message for requesting the session connection includes the feature tag, the session connection may be automatically accepted by the second communication terminal 120.

Before attempting to make the message-linked call, the first communication terminal 110 may include, in additional information, at least one message selected from among the target messages or message identification information providing guidance to enable acquisition of the at least one selected message, and may provide the additional information to the second communication terminal 120.

Further, when attempting to make the message-linked call, the first communication terminal 110 may include, in additional information, an emoticon expressing one's own state, etc., or emoticon identification information providing guidance to enable acquisition of the emoticon, and may provide the additional information to the second communication terminal 120. In addition, the first communication terminal 110 may add information, such as an image relating to a selected message-related event, a location, and an application, as additional information, and may provide the additional information to the second communication terminal 120.

The first communication terminal 110 may not directly transfer additional information to the second communication terminal 120, and may request a separate designated server 140, that is, in this case, a server 140 of a separate service provider (for example, OTT service WhatsApp, etc.) different from the service provider providing the network, to provide the additional information to the second communication terminal 120. This is referred to as a "$3^{rd}$-party service". The first communication terminal 110 may directly transfer, to the second communication terminal 120, some of information of the additional information requested to be provided to the second communication terminal 120, and may request the designated server 140 to provide the remaining information to the second communication terminal 120. For example, the first communication terminal 110 may directly transfer emoticon-related information, etc. to the second communication terminal 120, and may request the designated server 140 to transfer at least one selected message, etc. to the second communication terminal 120.

The first communication terminal 110 may provide the additional information to the second communication terminal 120 at the time of a session connection request. In this case, the session connection request may be a request for session connection for a message-linked call, instead of a request for session connection for transmitting the additional information.

The first communication terminal 110 may call the second communication terminal 120 for a message-linked call after transmitting the additional information. The first communication terminal 110 may establish an additional session with the second communication terminal 120 in order to request a message-linked call. That is, the first communication terminal 110 may request session connection for a message-linked call from the second communication terminal 120. In this case, calling for the message-linked call may be made after establishment of the additional session.

When the message-linked call is connected with the second communication terminal 120 in response to the call, the first communication terminal 110 may perform bidirectional communication with the second communication terminal 120. The first communication terminal 110 may update the shared additional information or add new information on the basis of the bidirectional communication with the second communication terminal 120. For example, the update of the additional information may be applied to change of location information according to change of an appointment place, and the addition of the additional information may be applied to the additional providing of a picture related to a voice call content, and the like.

When the message-linked call fails due to rejection of the second communication terminal 120 or the like, the first communication terminal 110 may prepare a call record based on the additional information and the fact of a call failure, and may store the call record. For example, if the second communication terminal 120 has transmitted a rejection reason by using the RTT, etc., the first communication terminal 110 may leave the rejection reason as a call record.

The first communication terminal 110 may store a call record according to the message-linked call to the second communication terminal 120. The call record may include the additional information provided to the second communication terminal 120 by the first communication terminal 110. This may be performed regardless of whether or not the message-linked call has been successful. However, the format of a call record stored when the message-linked call succeeds and the format of a call record stored when the message-linked call fails may be different. The first communication terminal 110 may use the stored call record as additional information when attempting the message-linked call to the second communication terminal 120.

Before, making a message-linked call, the second communication terminal 120 may configure display information which is convenient for confirming the purpose for calling, by using the additional information received from the first communication terminal 110, and may display the configured display information on a screen. The call receiver may confirm the display information displayed on the screen, and may then respond to a voice call request made from the first communication terminal 110.

According to an embodiment, the second communication terminal 120 informs the first communication terminal 110 of whether the second communication terminal 120 itself supports a message-linked reception mode in response to an inquiry from the first communication terminal 110. The second communication terminal 120 may set a message-linked reception mode for all phone numbers registered in an address book, or may set the message-linked reception mode for each phone number registered in the address book.

When a request for session connection is made from the first communication terminal 110, the second communication terminal 120 may or may not allow the session connection. The second communication terminal 120 may receive a session connection request message for transmitting additional information from the first communication terminal 110. The session connection request message may include a service function tag (feature tag) indicating that the session connection request message is for a message-linked call. When the received session connection request message includes the service function tag, the second communication terminal 120 may automatically accept the session connection.

The second communication terminal 120 may receive the additional information from the first communication terminal 110 through the connected session. The additional information may include at least one of message-related information and emoticon-related information. The message-related information may be at least one selected message or message identification information. The emoticon-related information may be an emoticon or emoticon identification information. In addition, the additional information may include information, such as an image related to a selected message-related event, a location, an application, and the like.

After receiving the additional information, the second communication terminal 120 may release the session for connecting the first communication terminal 110. For example, the second communication terminal 120 may release the session according to a request made by the first communication terminal 110.

The second communication terminal 120 may receive a session connection request message (SIP INVITE MESSAGE) for a message-linked call. In this case, the received session connection request message may include additional information. If the received session connection request message does not include additional information, the second communication terminal 120 may consecutively receive a session connection request message for transmission of additional information from the first communication terminal 110. The procedure in which the second communication terminal 120 receives a session connection request message for additional information and then receives the additional information provided from the first communication terminal 110 is the same as that described above.

When it is necessary to secure more additional information, the second communication terminal 120 may receive more additional information from the designated server 140. The second communication terminal 120 may use the received additional information in order to receive more additional information from the designated server 140. For example, the second communication terminal 120 may receive a selected message from the designated server 140 by using message identification information included in the additional information. Further, the second communication terminal 120 may receive a selected emoticon from the designated server 140 by using emoticon identification information included in the additional information.

The second communication terminal 120 may configure display information by using the additional information received from the first communication terminal 110, and may display the configured display information on the screen. The second communication terminal 120 may confirm the level set for the first communication terminal 110, and may configure the display information in a format preset for the confirmed level.

For example, the second communication terminal 120 may set a contact-information-specific level on the basis of the incoming call preference of registered contact information (phone numbers). The level may be classified as a full acceptance level, a partial acceptance level, a no acceptance level, and the like. In this case, the full acceptance level is a level for providing most of the additional information as display information, the partial acceptance level is a level for providing some of the additional information as display information, and the no acceptance level is a level for which the use of additional information is restricted. For example, the full acceptance level may be assigned to contact information classified as "lover", "family", etc., the partial acceptance level may be assigned to contact information classified as "colleague", "friend", etc., and the no acceptance level may be assigned to contact information classified as "acquaintances", "unspecified", etc.

As described above, the second communication terminal 120 may display, on the screen, display information in a format corresponding to the level (contact group) set for the first communication terminal 110.

The second communication terminal 120 may connect a session for a message-linked call to the first communication terminal 110 in order to receive a call for the message-linked call from the first communication terminal 110. The session for the message-linked call may be connected by the session connection request message received from the first communication terminal 110.

After connecting the session for the message-linked call, the second communication terminal 120 may receive a call for requesting the message-linked call from the first communication terminal 110. The second communication terminal 120 may allow or reject connection of the message-linked call according to the received call.

The second communication terminal 120 enables a voice call to proceed in the situation where a call receiver has recognized the purpose for calling, by providing the purpose for calling to the call receiver during the message-linked call to the first communication terminal 110.

When rejecting the message-linked call, the second communication terminal 120 may provide a reason for rejection to the first communication terminal 110, by activating the RTT function or the like. When the message-linked call is connected, the second communication terminal 120 may perform bidirectional communication with the first communication terminal 110.

The second communication terminal 120 may update the additional information shared between the first communication terminal 110 and the second communication terminal 120 on the basis of the bidirectional communication, or may add new information. For example, updating the additional information may be applied to change of location information according to the change of an appointment place, and adding the new additional information may be applied to the additional providing of a picture related to a voice call content, and the like.

The second communication terminal 120 may store a call record according to the message-linked call to the first communication terminal 110. The call record may include additional information provided to the first communication terminal 110 by the second communication terminal 120. This may be performed regardless of whether or not the message-linked call is successful. However, the format of a call record stored when the message-linked call succeeds and the format of a call record stored when the message-linked call fails may be different. The second communication terminal 120 may use the stored call record as additional information when attempting to make the message-linked call to the first communication terminal 110.

Figure 2:
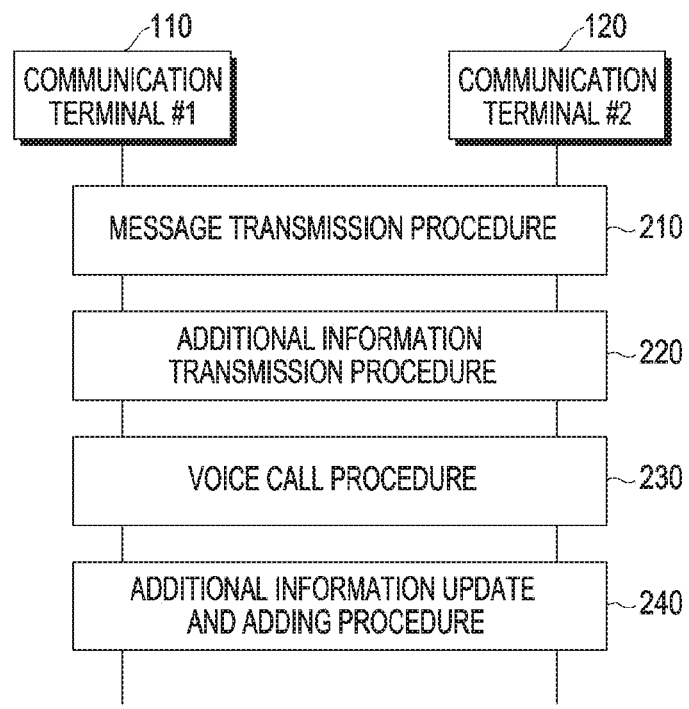
FIG. 2 is a diagram illustrating a procedure for supporting a voice call between communication terminals according to proposed various embodiments.

FIG. 2 is a diagram illustrating a procedure for supporting a voice call between communication terminals according to proposed various embodiments.

Referring to FIG. 2, the first communication terminal 110 is a transmission terminal, and the second communication terminal 120 is a reception terminal. The first communication terminal 110 may create a message and transmit the created message to the second communication terminal 120, step 210. The second communication terminal 120 may also create a message and transmit the created message to the first communication terminal 110, step 210. The first communication terminal 110 and the second communication terminal 120 may use an application through which a message can be exchanged. The application to be used is not limited to a specific application. That is, if an application supports transmission of text, images, media files, and the like, the application can be used regardless of the type thereof.

The first communication terminal 110 and the second communication terminal 120 may store a transmitted/received message in a storage box. The first communication terminal 110 and the second communication terminal 120 may the same message through the message transmission procedure. However, the message transmitted by the first communication terminal 110 does not necessarily need to be confirmed by the second communication terminal 120, or the message transmitted by the second communication terminal 120 does not necessarily need to be confirmed by the first communication terminal 110 in order for the message to be shared.

The message shared between the first communication terminal 110 and the second communication terminal 120 may include a response message. The response message may be a message transferred by the second communication terminal 120 in response to a message received from the first communication terminal 110, or may be a message transferred by the first communication terminal 110 in response to the message received from the second communication terminal 120. Each of the first communication terminal 110 and the second communication terminal 120 may store shared messages as target messages for a message-linked call.

The first communication terminal 110 performs an additional information transmission procedure for sharing additional information with the second communication terminal 120, step 220. Transmission of the additional information may enable a message-linked call for the first communication terminal 110 and the second communication terminal 120. That is, the first communication terminal 110 shares the purpose of the voice call to the second communication terminal 120. The additional information may include information relating to one or multiple selected messages selected from among the target messages stored by the first communication terminal 110 and the second communication terminal 120. The target messages may be transmission messages and reception messages, which are transmitted and stored by the first communication terminal 110 or by the second communication terminal 120 according to the message transmission procedure.

The additional information may include information relating to an emoticon selected for requesting a voice call. In addition, the additional information may further include information relating to at least one among a call subject, a picture, a location, a media file, and an application file. When the additional information includes information relating to the emoticon, the second communication terminal 120 may recognize the current mood of the caller of the first communication terminal 110, etc.

Information relating to a message included in the additional information may be a selected message or identification information indicating the selected message. The information relating to the emoticon may be the emoticon selected for requesting a voice call or identification information indicating the selected emoticon.

The second communication terminal 120 may configure display information on the basis of the additional information received from the first communication terminal 110, and may display the configured display information through a screen before the voice call is made. For example, the display information may be configured in consideration of the level set for the second communication terminal 120 with respect to the first communication terminal 110. The level may be set in consideration of incoming call preferences for the first communication terminal 110.

When configuring the display information, the second communication terminal 120 may further consider information relating to the first communication terminal 110, which the second communication terminal 120 itself has known, in addition to the additional information. The second communication terminal 120 may acquire information, that is to be additionally considered, from an external server or the like.

The additional information transmission procedure may include a procedure of confirming whether a message-linked transmission mode has been activated for the first communication terminal 110, and a procedure of confirming whether a message-linked reception mode has been activated for the second communication terminal 120. The message-linked transmission mode may be set for each registered phone number or may be collectively set. Further, both a collective setting and a phone number-specific setting may be supported.

The additional information transmission procedure may be performed only when the message-linked transmission mode is activated for the first communication terminal 110 and the message-linked reception mode is activated for the second communication terminal 120.

The first communication terminal 110 and the second communication terminal 120 perform a voice call procedure, step 230. For example, the voice call procedure may be performed by which the first communication terminal 110 calls the second communication terminal 120 and the second communication terminal 120 responds to the call.

When the voice call is successfully made, the first communication terminal 110 and the second communication terminal 120 may perform an additional information updating-and-adding procedure, step 240. The additional information updating-and-adding procedure corresponds to a procedure for changing additional information shared between two communication terminals 110 and 120 or additionally sharing new information. For example, a bidirectional communication is required to be available between the first communication terminal 110 and the second communication terminal 120 in order to perform the additional information updating-and-adding procedure.

Meanwhile, the first communication terminal 110 and the second communication terminal 120 may store a call record according to a message-linked call. The call record may include information displayed on a screen on the basis of the additional information. The call record may be stored regardless of whether or not the message-linked call is successful. However, the format of the call record stored when the message-linked call succeeds and the format of the call record stored when the message-linked call fails may be different.

The first communication terminal 110 may use the stored call record as additional information when attempting to make a message-linked call to the second communication terminal 120. The second communication terminal 120 may also use the stored call record as additional information when attempting to make a message-linked call to the first communication terminal 110.

Figure 3:
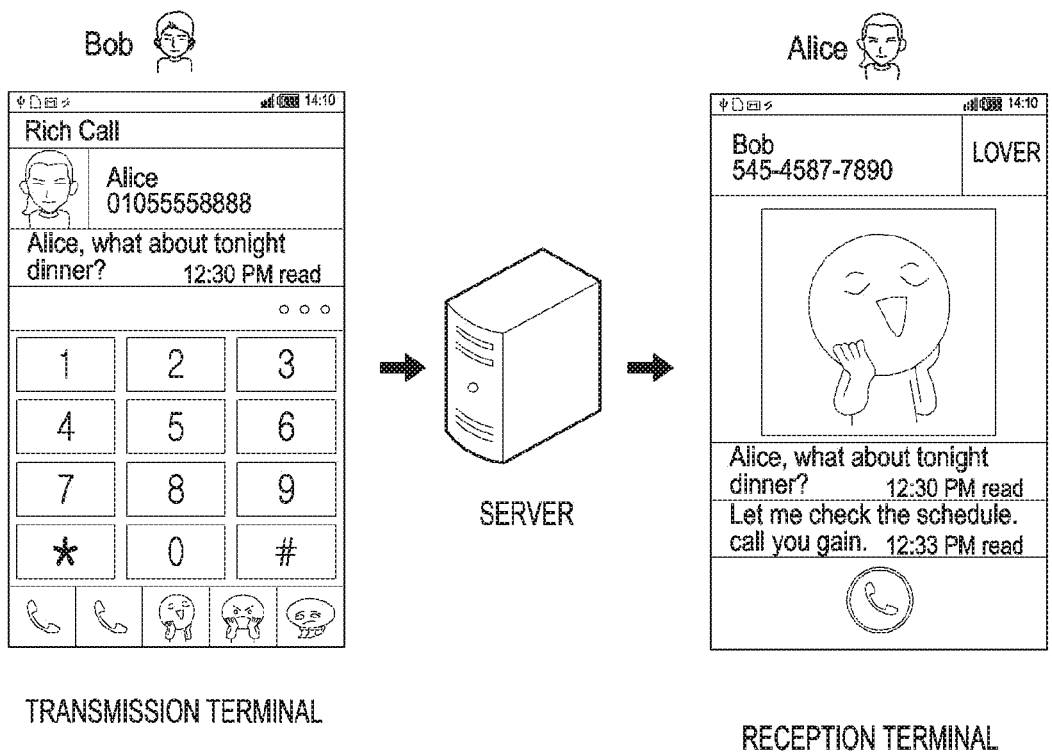
FIG. 3 is a diagram illustrating an example of a network structure according to proposed various embodiments.

FIG. 3 is a diagram illustrating an example of a network structure according to proposed various embodiments.

Referring to FIG. 3, it may be easy to implement a message-linked call service performed by a transmission terminal and a reception terminal on the basis of an IP call, but it may also be possible to implement the message-linked call in a network that does not support an IP call.

When an IP call is supported, the transmission terminal may define a service configuration tag for a message-linked call, and may set whether or not to support a message-linked call service (message-linked transmission mode) for each classification of registered phone numbers. Further, the transmission terminal may define a URL, a header, a content type, emoticon information (index and URL), message information (index and URL), etc., which are used to transfer additional information for the message-linked call to a reception terminal.

A server may support service configuration tag authentication for the message-linked call, and connection with an application. The server may perform user authentication and authorization confirmation for the message-linked call, and may verify the message-linked call from the transmission terminal.

The reception terminal may set whether or not to support the message-linked call service (message-linked reception mode) for each classification of registered phone numbers. The reception terminal may define automatic reception of additional information for the message-linked call. The reception terminal may display a message and/or an emoticon corresponding to a value included in the additional information. The reception terminal may display further information provided by the additional information.

When the IP call is not supported, the transmission terminal may set whether or not to support the message-linked call service (message-linked transmission mode) for each classification of registered phone numbers. Further, the transmission terminal may define a $3^{rd}$-party application identifier, a URL, a header, a content type, emoticon information (index and URL), message information (index and URL), etc., for the additional information for the message-linked call.

In order to provide a service from a $3^{rd}$ party, the server may perform message-linked call service authentication, user authentication, and authorization confirmation, and may confirm an application identifier, a URL, a header, a content type, emoticon information, message information, etc., for performing verification in response to a message-linked call request.

The reception terminal may define automatic reception of additional information for the message-linked call. The reception terminal may display a message and/or an emoticon corresponding to a value included in the additional information. The reception terminal may display further information provided by the additional information.

Figure 4:
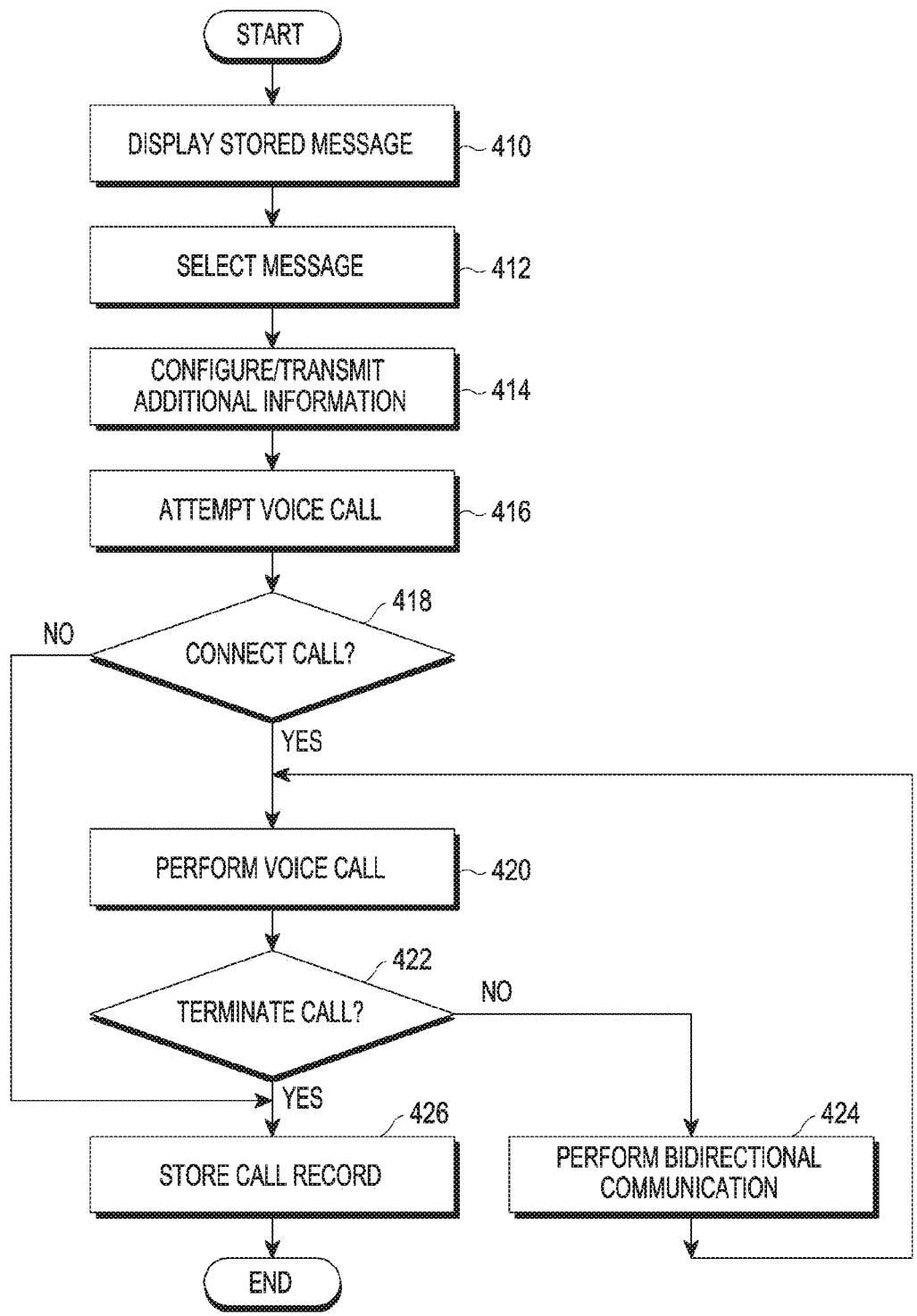
FIG. 4 is a diagram illustrating a control flow performed for a message-linked call by a transmission terminal according to proposed various embodiments.

FIG. 4 is a diagram illustrating a control flow performed for a message-linked call by a transmission terminal according to proposed various embodiments. Here, it is assumed that a transmission terminal has transmitted one or multiple messages to be used for a message-linked call to a reception terminal or has received the one or multiple messages from the reception terminal, and the one or multiple transmitted or received messages are stored.

Referring to FIG. 4, the transmission terminal displays stored messages on the screen in step 410. The stored messages may be displayed in response to a message-linked call request or a stored message confirmation request. The case where the stored messages are displayed in response to a message-linked call request and the case where the stored messages are displayed in response to a stored message confirmation request may affect subsequent operations.

For example, in the case where the stored messages are displayed in response to the message-linked call request, the transmission terminal is in a state in which some or all of the stored messages may be selected for the message-linked call. Therefore, when the stored messages are displayed, the transmission terminal may prepare a user interface (UI) to make message selection easy. However, when the stored messages are displayed in response to the message confirmation request, an additional operation for message selection may be required for message communication. For example, an additional operation for switching from a UI prepared to enable normal message confirmation to a UI for enabling message selection may be required.

In step 412, the transmission terminal may select at least one message to be used for a message-linked call from among the displayed stored messages. The at least one message may be directly selected by a user, or may be selected by classification based on specific information. For example, a desired message may be selected by primarily classifying the stored messages according to a specific phone number and then secondarily classifying the primarily classified stored messages according to a transmitted time or a received time.

In step 414, the transmission terminal may configure additional information for the message-linked call, and may transmit the configured additional information to the reception terminal. The transmission terminal may display the configured additional interface on the screen. The additional information may include at least one of information relating to at least one previously selected message and information relating to an emoticon selected for a message-linked call. In addition, the additional information may further include information relating to at least one among a call subject, a picture, a location, a media file, an application file, and the like.

In step 416, the transmission terminal may attempt to call the reception terminal, for a message-linked call to the reception terminal. The attempt to make a voice call may be performed by calling the reception terminal by using the phone number corresponding to the reception terminal.

In order to attempt to make the message-linked call, the transmission terminal needs to confirm whether the message-linked call for the reception terminal is possible. Confirmation of whether or not the message-linked call to the reception terminal is possible may be made at any time before attempting a call according to the message-linked call.

For example, whether or not the message-linked call to the reception terminal is possible may be determined based on whether the transmission terminal allows itself to support the message-linked call for the reception terminal and whether the reception terminal allows the message-linked call to the transmission terminal.

The transmission terminal may determine in step 418 whether connection of the message-linked call for the call attempt has been established. The connection of the message-linked call may be established when the reception terminal allows the call. When the reception terminal allows the message-linked call, the transmission terminal may perform a voice call in step 420. The transmission terminal continuously monitors in step 422 whether the voice call has terminated. The transmission terminal may perform bidirectional communication with the reception terminal in step 424 while the call is underway. The transmission terminal may update the additional information or add new information through the bidirectional communication with the reception terminal.

When the call connection is rejected by the reception terminal or the voice call is terminated, the transmission terminal may store a call record according to the message-linked call in step 426. The call record may include additional information provided by the transmission terminal to the reception terminal. This may be performed regardless of whether or not the message-linked call is successful. However, the format of the call record stored when the message-linked call succeeds and the format of the call record stored when the message-linked call fails may be different. The transmission terminal may use the stored call record as additional information when attempting the message-linked call to the reception terminal.

Figure 5:
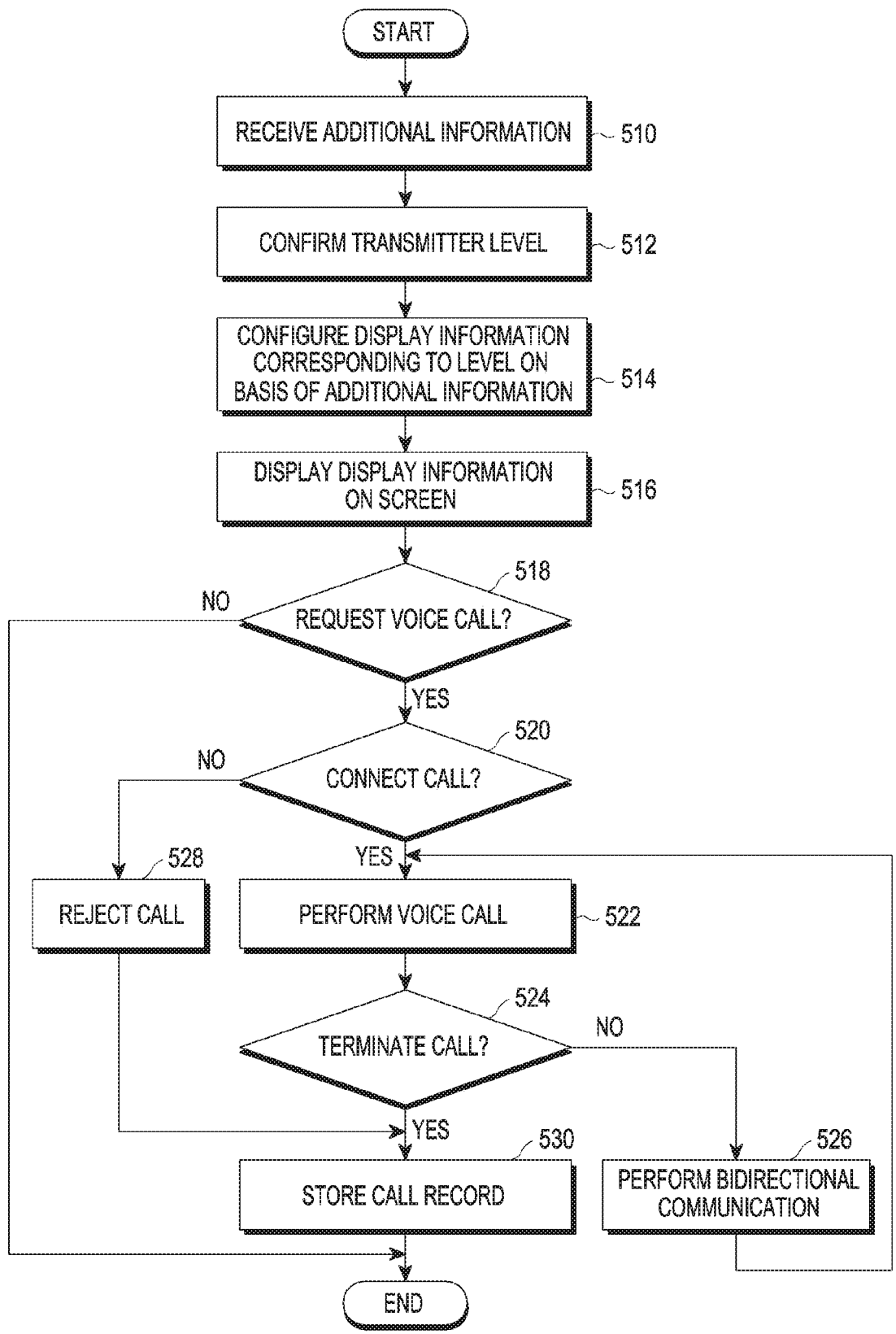
FIG. 5 is a diagram illustrating a control flow performed for a message-linked call by a reception terminal according to proposed various embodiments.

FIG. 5 is a diagram illustrating a control flow performed for a message-linked call by a reception terminal according to proposed various embodiments. Here, it is assumed that a reception terminal has transmitted one or multiple messages to be used for a message-linked call to a transmission terminal or has received the one or multiple messages from the transmission terminal, and that the one or multiple transmitted or received messages are stored.

Referring to FIG. 5, the reception terminal may confirm whether a message-linked reception mode has been activated (receive a rich call=on) as its own call mode, and may transfer the confirmation result to the transmission terminal. Further, the reception terminal connects, to the transmission terminal, a session for receiving additional information from the transmission terminal. The reception terminal may recognize that the transmission terminal is to attempt a message-linked call, on the basis of a service configuration tag included in a session connection request message received from the transmission terminal in order to connect a session. The reception terminal may automatically accept session connection when the received session connection request message includes the service configuration tag.

The reception terminal receives additional information from the transmission terminal in step 510. The additional information may include at least one of message-related information and emoticon-related information. In addition, the additional information may further include information relating to at least one of a call subject, a picture, a location, a media file, an application file, and the like.

After receiving the additional information, the reception terminal may release the session that connects the transmission terminal. For example, the reception terminal may release the session in response to a request of the transmission terminal.

The reception terminal confirms a level for classifying the transmission terminal for a message-linked call, in step 512. For example, the reception terminal may set a contact-information-specific level on the basis of an incoming call preference of registered contact information (phone numbers). The level may be classified as a full acceptance level, a partial acceptance level, a no acceptance level, and the like. In this case, the full acceptance level is a level for providing most of the additional information as display information, the partial acceptance level is a level for providing some of the additional information as display information, and the no acceptance level is a level for which the use of additional information is restricted. For example, the full acceptance level may be assigned to contact information classified as "lover", "family", etc., the partial acceptance level may be assigned to contact information classified as "colleague", "friend", etc., and the no acceptance level may be assigned to contact information classified as "acquaintances", "unspecified", etc.

In step 514, the reception terminal may configure display information corresponding to the level confirmed using the additional information received from the transmission terminal. The reception terminal may predefine the format of the display information corresponding to the confirmed level.

In step 516, the reception terminal may display the configured display information on the screen. The display information displayed on the screen may be helpful for a call receiver to confirm the purpose of a voice call request made by a caller.

In step 518, the reception terminal monitors whether a message-linked call request is received from the transmission terminal. When a message-linked call request is received, the reception terminal may connect a session for the message-linked call to the transmission terminal. The session for the message-linked call may be connected based on the session connection request message received from the transmission terminal. After the session for the message-linked call is connected, the reception terminal may receive a call for requesting the message-linked call from the transmission terminal.

In step 520, the reception terminal may allow or reject connection of the message-linked call according to the received call. When the call receiver requests a call connection, the reception terminal may perform a voice call according to the message-linked call to the transmission terminal in step 522.

In step 524, the reception terminal continuously monitors whether the voice call is terminated. While the call is underway, the reception terminal may perform bidirectional communication with the transmission terminal in step 526. The reception terminal may update the additional information or add new information through the bidirectional communication with the transmission terminal.

When the call connection is rejected or the voice call is terminated, the reception terminal may store a call record according to the message-linked call in step 530. The call record may include the additional information received by the reception terminal from the transmission terminal. This may be performed regardless of whether or not the message-linked call is successful. However, the format of the call record stored when the message-linked call succeeds and the format of the call record stored when the message-linked call fails may be different. The reception terminal may use the stored call record as additional information when attempting the message-linked call to the transmission terminal.

Figure 6:
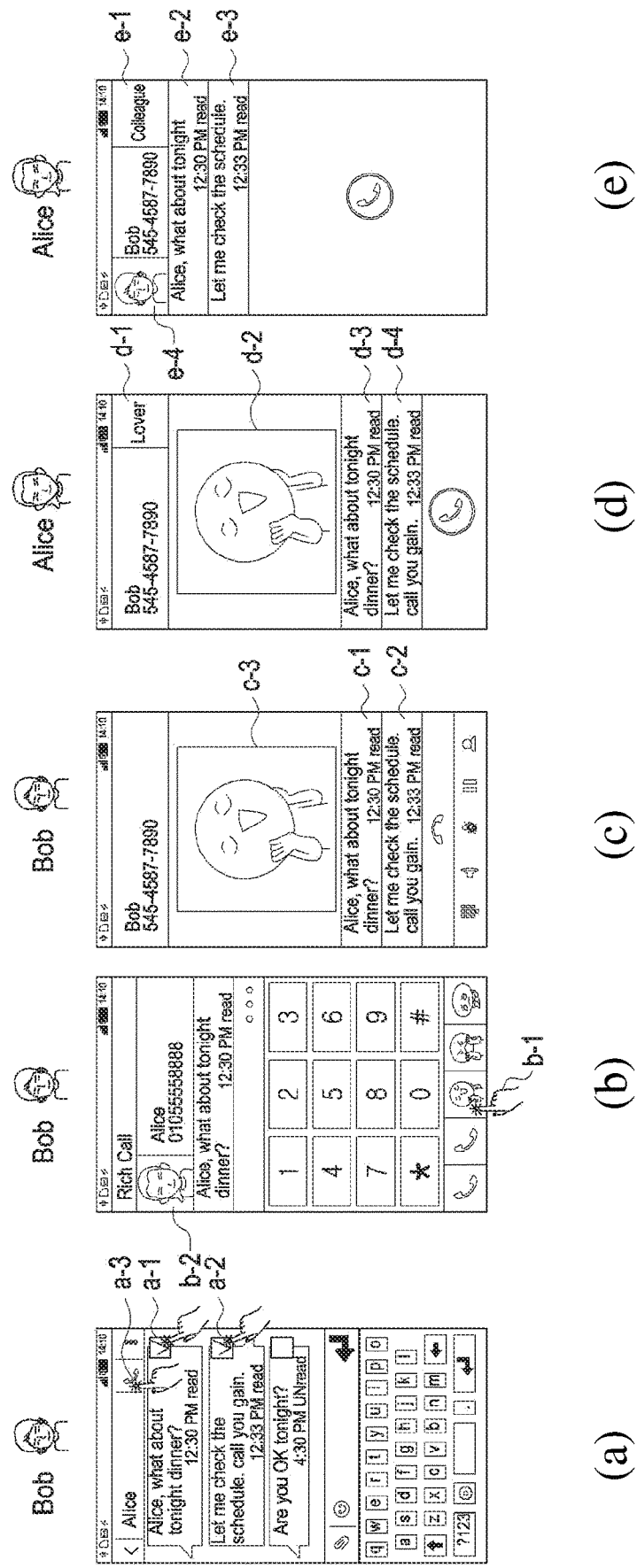
FIG. 6 is a diagram illustrating examples of a display screen for a message-linked call by a communication terminal according to proposed various embodiments.

FIG. 6 is a diagram illustrating examples of a display screen for a message-linked call by a communication terminal according to proposed various embodiments.

Referring to FIG. 6, (a) to (c) are display screens in a transmission terminal, and (d) and (e) are display screens in a reception terminal.

Display screen (a) shows the situation where a caller selects two messages a-1 and a-2 among target messages and presses a call sign a-3 for requesting a voice call. The finger figure is not shown on the actual screen.

Display screen (b) corresponds to display screen (a) generated according to pressing of the call sign a-3 by the caller. Display screen (b) may include information b-2 (a name, a phone number, a registered image, etc.) normally displayed by a voice call request and messages selected by the caller for a message-linked call. Further, display screen (b) may display at least one emoticon for requesting the message-linked call. When the caller desires to make a message-linked call, the caller may press one b-1 of the at least one displayed emoticon.

Display screen (c) is a display screen shown in response to a message-linked call request made by the caller. Display screen (c) may include information b-2 (a name, a registered image, etc.) normally displayed by a voice call request, an emoticon c-3, messages c-1 and c-2 selected by the caller for a message-linked call, and the like.

Display screen (d) corresponds to a screen displayed in the reception terminal on the basis of additional information received from the transmission terminal in the case where the caller is classified as "lover" in the reception terminal. Display screen (d) may display counterpart information (a name, a phone number, etc.) displayed at the time of a normal voice call, a group d-1 in which the caller is classified, an emoticon d-2 included in additional information, and selected messages d-3 and d-4 included in the additional information.

Display screen (e) corresponds to a screen displayed in the reception terminal on the basis of the additional information received from the transmission terminal in the case where the caller is classified as "colleague" in the reception terminal. Display screen (e) may display counterpart information e-4 (a name, a phone number, an image, etc.) displayed at the time of a normal voice call, a group e-1 in which the caller is classified, and selected messages e-2 and e-3 included in the additional information.

For example, when a message-linked transmission mode has been activated (make a rich call=ON) as a call mode of the transmission terminal and it is confirmed that a message-linked call is available for the reception terminal, the transmission terminal may select a message to be transmitted to the reception terminal for the message-linked call, and may select information to be additionally transmitted, such as a call subject, a picture, a location, a schedule (calendar), an audio/video file, a specific application file (e.g., Evernote), and the like. The transmission terminal may attempt transmission of additional information configured by the selected information, and the message-linked call based thereon.

The caller selects two messages (12:30 PM and 12:33 PM) transmitted to the call receiver in display screen (a), and then presses a connection button for the message-linked call in the switched displayed screen (b). The connection button corresponds to a specific emoticon, and pressing of the connection button may include selecting a corresponding emoticon. Alternatively, it may be possible to request the message-linked call by selecting an emoticon and then pressing a normal call button.

In this case, a display screen of the transmission terminal is the same as display screen (c). Display screen (c) may display the selected message and the selected emoticon in addition to a basic display item, such as a name and a phone number set by a user.

When a normal call, which is not a message-linked call, is set (make a rich call=OFF) as a call mode of the transmission terminal, the transmission terminal may attempt to make a normal call.

In response to the attempt, when the message-linked call reception mode is activated (receive a rich call=ON) as a call mode, the reception terminal may allow or reject call connection on the basis of the additional information received from the transmission terminal.

The reception terminal may consider the group to which the transmission terminal belongs when display information is configured based on the additional information. For example, if the transmission terminal is classified as a group member (e.g., lover), for which a more detailed (richer) message-linked call is available, among contact information groups for which the message-linked call set for the reception terminal is available, the reception terminal may configure display information to include an emoticon, as display information for display screen (d). However, if the transmission terminal is classified as a group member (e.g., colleague), for which a detailed (rich) message-linked call is available, among contact information groups to which the transmission terminal can make a message-linked call, a display screen may be configured only by a call subject and a selected message due to data rate restriction or personal preference of the reception terminal (see display screen (e)).

If the call mode of the reception terminal is set not to support a message-linked call (receive a rich call=OFF), or the reception terminal has classified the transmission terminal as a contact information group (e.g., unspecified) for which a message-linked call is unavailable, the reception terminal may not output any information included in the additional information on the screen and may allow connection as a normal call or reject the message-linked call.

Figure 7:
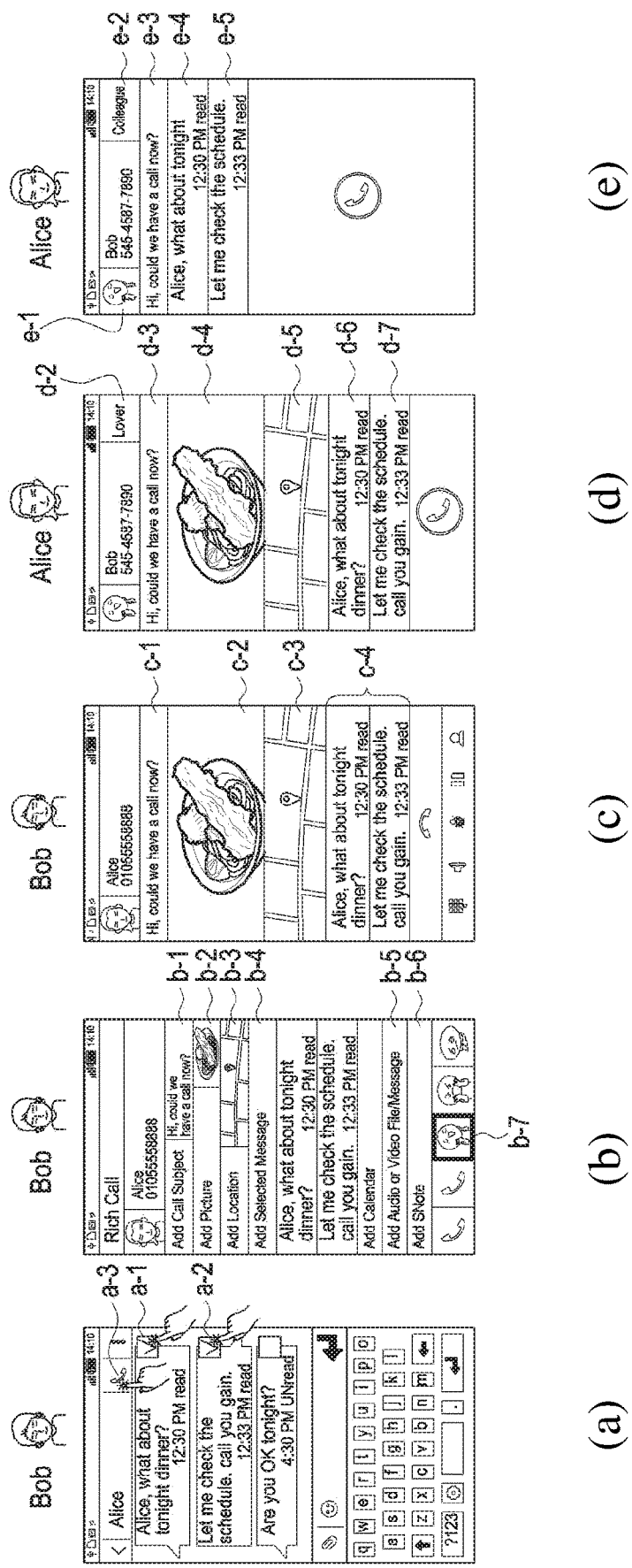
FIG. 7 is a diagram illustrating examples of a display screen for a message-linked call by a communication terminal according to proposed various embodiments.

FIG. 7 is a diagram illustrating examples of a display screen for a message-linked call by a communication terminal according to proposed various embodiments.

Referring to FIG. 7, (a) to (c) are display screens in a transmission terminal, and (d) and (e) are display screens in a reception terminal.

Display screen (a) shows the situation where a caller selects two messages a-1 and a-2 among target messages and presses a call sign a-3 for requesting a voice call. The finger figure is not shown on the actual screen.

Display screen (b) corresponds to a display screen generated according to pressing of the call sign a-3 in display screen (a) by the caller. Display screen (b) shows an example in which further information is selected in addition to information (a name, a phone number, a registered image, etc.) normally displayed by a voice call request and messages b-4 selected by the caller for a message-linked call. The additional information in display screen (b) may include a subject b-1, a relevant picture b-2, location information (map) b-3, a media file b-5, etc. for a message-linked call. Further, display screen (b) may display at least one emoticon for requesting a message-linked call. When the caller wants the message-linked call, the caller may press one b-7 of the at least one displayed emoticon. Alternatively, the caller may press a normal call button (green).

Display screen (c) corresponds to a display screen of the transmission terminal responded to a message-linked call request made by the caller. Display screen (c) may include information (a phone number, a registered image, etc.) normally displayed in response to a voice call request, selected messages c-4, and further information. The further information may be configured by a subject c-1, a relevant picture c-2, location information (map) c-3, and the like.

Display screen (d) corresponds to a screen displayed in the reception terminal on the basis of additional information received from the transmission terminal in the case where the caller is classified as "lover" in the reception terminal. Display screen (d) may display counterpart information (a name, a phone number, an emoticon, etc.) displayed during an emoticon call, a group d-2 in which a transmitter is classified, selected messages d-6 and d-7 included in the additional information, and a subject d-3, a relevant picture d-4, and location information (map) d-5, which are provided as further information in the additional information.

Display screen (e) corresponds to a screen displayed in the reception terminal on the basis of the additional information received from the transmission terminal in the case where the caller is classified as a "colleague" in the reception terminal. Display screen (e) may display counterpart information e-1 (a name, a phone number, an emoticon, etc.) displayed during an emoticon call, a group e-2 in which a transmitter is classified, selected messages e-4 and e-5 included in the additional information, and a subject e-3.

For example, when a message-linked transmission mode has been activated (make a rich call=ON) as a call mode of the transmission terminal and it is confirmed that a message-linked call is available for the reception terminal, the transmission terminal may select a message to be transmitted to the reception terminal for the message-linked call, and may select information to be additionally transmitted, such as a call subject, a picture, a location, a schedule (calendar), an audio/video file, a specific application file (e.g., Evernote), and the like. The transmission terminal may attempt transmission of additional information configured by the selected information, and the message-linked call based thereon.

The caller has selected two messages (12:30 PM and 12:33 PM) transmitted to the call receiver in display screen (a). In display screen (b), the caller adds a call subject (Hi, could we have a call now?), a picture, and a location to the additional information, and then presses a connection button for the message-linked call. In this case, the display screen of the transmission terminal is the same as display screen (c). Display screen (c) displays a selected message and further information in addition to the name and the phone number of a call receiver, which are basic display items.

When a normal call, which is not a message-linked call, is set (make a rich call=OFF) as a call mode of the transmission terminal, the transmission terminal may attempt to make a normal call.

In response to the attempt, when the message-linked call reception mode is activated (receive a rich call=ON) as a call mode, the reception terminal may allow or reject call connection on the basis of the additional information received from the transmission terminal.

The reception terminal may consider the group to which the transmission terminal belongs when display information is configured based on the additional information. For example, if the transmission terminal is classified as a group member (e.g., lover), for which a more detailed (richer) message-linked call is available, among contact information groups for which the message-linked call set for the reception terminal is available, the reception terminal may configure display information for display screen (d). However, if the transmission terminal is classified as a group member (e.g., colleague), for which a detailed (rich) message-linked call is available, among contact information groups to which the transmission terminal can make a message-linked call, a display screen may be configured only by a call subject and a selected message due to data rate restriction or personal preference of the reception terminal (see display screen (e)).

If the call mode of the reception terminal is set not to support a message-linked call (receive a rich call=OFF), or the reception terminal has classified the transmission terminal as a contact information group (e.g., unspecified) for which a message-linked call is unavailable, the reception terminal may not output any information included in the additional information on the screen and may allow connection as a normal call or reject the message-linked call.

Figure 8:
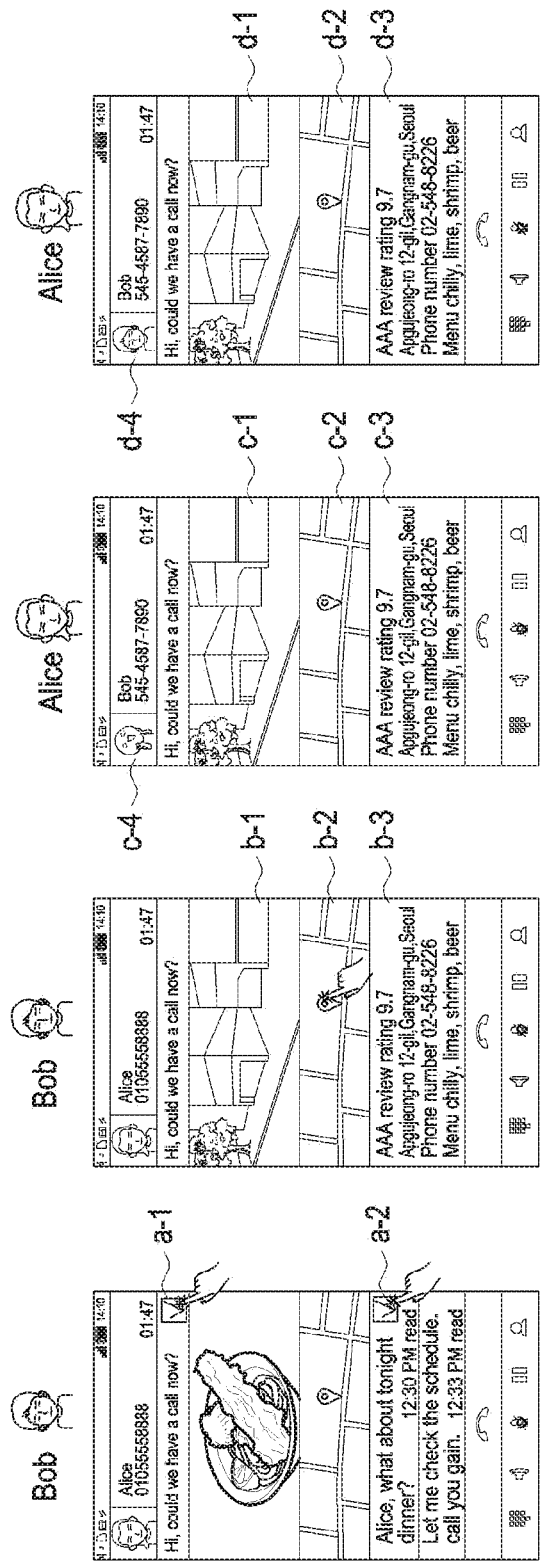
FIG. 8 is a diagram illustrating a scenario for updating additional information by a communication terminal on the basis of bidirectional communication according to proposed various embodiments.

FIG. 8 is a diagram illustrating a scenario for updating additional information by a communication terminal on the basis of bidirectional communication according to proposed various embodiments.

Referring to FIG. 8, (a) and (b) are display screens in a transmission terminal, and (c) and (d) are display screens in a reception terminal.

Display screen (a) shows that a subject a-1 and messages a-2 are selected as objects to be removed from a display screen according to a message-linked call. The finger figure is not shown on the actual screen. For example, after call connection, as shown in display screen (a), it is possible for a caller to disable a message ("Alice, what about tonight dinner? Let me check the schedule. Call you again") and a call subject ("Hi, could we have a call now?"), which are disclosed on the screen.

Display screen (b) shows an example in which information of selected items are removed from display screen (a), and a picture b-1 and location information b-2, which are additionally input by a caller, and a new message b-3 are displayed. The removed information and additionally input/updated information may be transferred to the transmission terminal on the basis of bidirectional communication.

For example, as shown in display screen (b), in order to acquire detailed information relating to a location on a map (e.g., a restaurant), which is marked on a call connection screen, the caller may touch the corresponding position. In this case, it may be possible to add new information according to the touch or existing information (e.g., a restaurant homepage) may be updated. The transmission terminal may transfer the new information or the updated information to the reception terminal, so as to share the new information or the updated information. At this time, the newly updated information (e.g., a location, a webpage link, etc.) may be transferred to the reception terminal through an MSRP message within a previously established session. Alternatively, the transmission terminal may transmit a separate message for transmission of newly updated information separately from the previously established session.

Display screens (c) and (d) show an example of screens displayed in the reception terminal, on the basis of the additional information updated by the transmission terminal. Display screens (c) and (d) may maintain counterpart information c-4 and d-4 (a name, a phone number, an image or an emoticon, etc.) displayed during an emoticon call, may remove previously displayed information, and may then newly display updated pictures c-1 and d-1, location information c-2 and d-2, and new messages c-3 and d-3.

For example, the reception terminal may confirm additionally provided new information or updated information (detailed location information, e.g., a restaurant homepage) while viewing an emoticon received from the transmission terminal, so that a receiver may more smoothly use a message-linked call.

Figure 9:
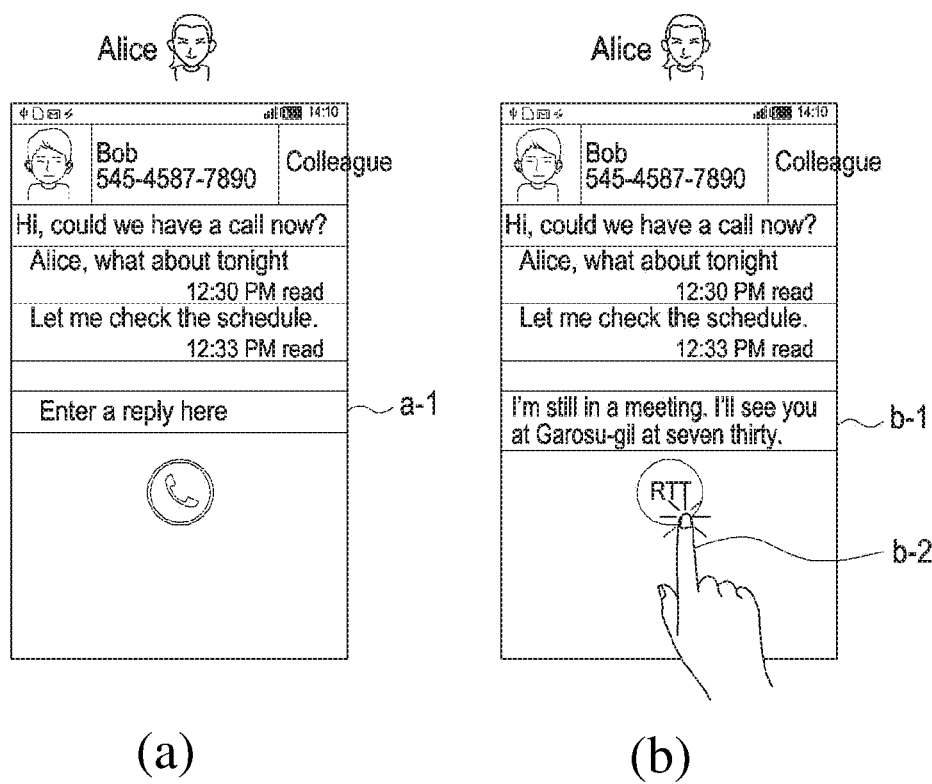
FIG. 9 is a diagram illustrating an example of a screen in which a reception terminal rejects a message-linked call according to proposed various embodiments.

FIG. 9 is a diagram illustrating an example of a screen in which a reception terminal rejects a message-linked call according to proposed various embodiments.

Referring to FIG. 9, display screen (a) provides a screen which displays a display screen according to a message-linked call and then provides notification that there is a call. At this time, when a message-linked call reception mode is activated (Receive a Rich Call=ON) as a call mode of the reception terminal, a call receiver may confirm display screen (a) and may then allow or reject connection of a call. Display screen (a) may display a guidance wording a-1 "Enter a reply here" in preparation for call rejection. When the corresponding call is rejected, the call receiver may input text explaining the reason for the rejection. If the call receiver is in a situation in which it is difficult to receive a call (Still in Meeting), the call receiver may transmit a desired message one character at a time to the transmission terminal by using the RTT function.

For example, as shown in display screen (b), the call receiver may activate the RTT function b-2, and may input a message b-1 "I'm still in a meeting. I'll see you at Garosu-gil at seven thirty." In this case, the message input by the call receiver on the basis of the RTT function may be transferred one character at a time to the transmission terminal. The transmission terminal may confirm, in real time, the text input using the reception terminal by the call receiver.

Figure 10:
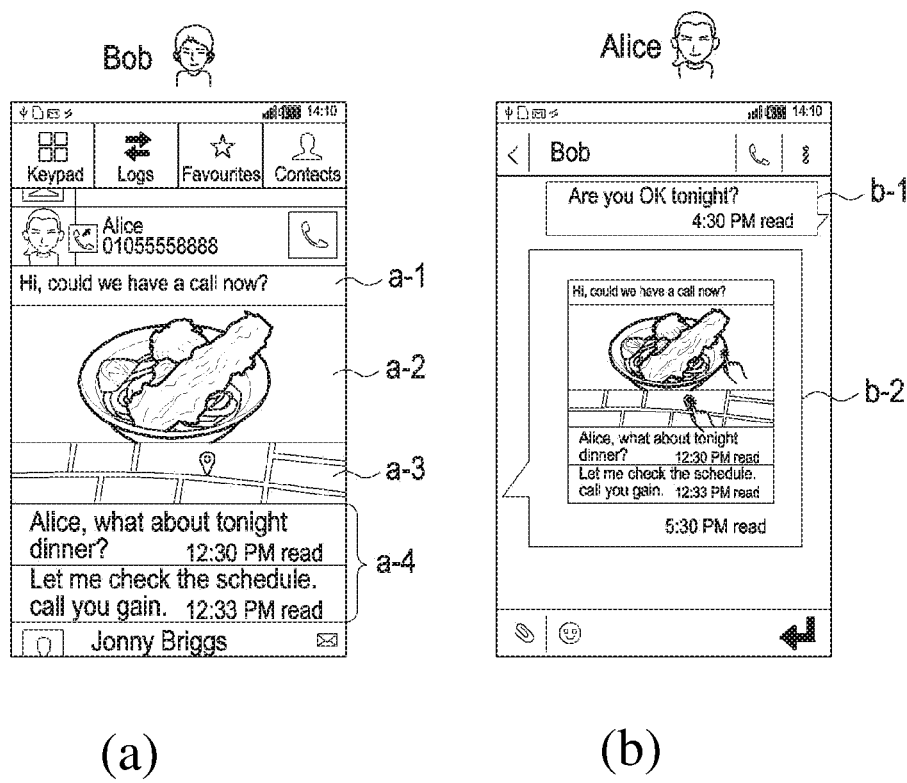
FIG. 10 is a diagram illustrating an example of a screen in which a transmission terminal has attempted a message-linked call by using a call record according to proposed various embodiments.

FIG. 10 is a diagram illustrating an example of a screen in which a transmission terminal has attempted a message-linked call by using a call record according to proposed various embodiments.

Referring to FIG. 10, display screen (a) corresponds to a screen in which the transmission terminal imports one of stored call records. Display screen (a) may include information (a phone number, a registered image, etc.) normally displayed in response to a voice call request, further information, and selected messages a-4. The further information may be configured by a subject a-1, a relevant picture a-2, location information (map) a-3, and the like. In the situation where display screen (a) is displayed, when a caller requests a message call, the transmission terminal may configure a message using some of the information in display screen (a) and provide the configured message to the reception terminal. For example, some of the information used to configure the message may include the subject a-1, the relevant picture a-2, the location information (map) a-3, and the selected messages a-4.

Display screen (b) shows an example of a screen in which the reception terminal transmits a text message b-1 to the transmission terminal and receives a call record b-2 in response thereto.

For example, when a message-linked reception mode is activated (receive a rich call=ON) as a call mode of the reception terminal, a call receiver confirms additional information displayed in the reception terminal and may then connect or reject a call.

When the call receiver does not respond to the call or rejects the call, the reception terminal may store not only a phone number of the transmission terminal and a reception time which are included in the display screen but also further information, such as a call subject, a picture, a location, and a selected message, in a received call record or a missed call record. The call receiver may confirm call content in greater detail when confirming the call record at a later time. It may be possible for the call receiver to attempt to make a message-linked call to the transmission terminal by using the call record stored in the reception terminal.

When the call receiver does not respond to the call or rejects the call, the transmission terminal may store not only the phone number of the reception terminal and the reception time which are included in display screen (a) but also further information, such as a call subject, a picture, a location, and a selected message, in a received call record or a missed call record. The call receiver may confirm call content in greater detail when confirming the call record at a later time. It may be possible for the call receiver to attempt a message-linked call to the reception terminal by using the call record stored in the transmission terminal.

Like the above, the transmission terminal may provide the reception terminal with a detailed call content extracted from the stored call record according to the message-linked call, via an Interactive MMS. The reception terminal may display the detailed call content transmitted by the transmission terminal via the Interactive MMS (see display screen (b)).

The Interactive MMS has a multi-message function for including a text, an image, and a moving image of 140 bytes or more, map information which is not in an image form and is capable of enlargement/reduction/motion, etc., and a user-selected message in a message-in-message (Min) form, and the Interactive MMS is an evolved form of MMS, which enables storage on the basis of information transmitted by the transmission terminal during other message-linked calls.

The reception terminal is capable of confirming a corresponding call record from a received call record or a missed call record stored therein, by using the Interactive MMS provided by the transmission terminal.

Meanwhile, the call receiver is also capable of confirming linked detailed information in addition to simple reduction/enlargement by clicking a picture, a location, a file, etc. existing within the Interactive MMS displayed in the reception terminal. When the Interactive MMS is retransmitted, the call receiver is capable of editing the Interactive MMS or a call record acquired by the Interactive MMS, and selectively transmitting only information necessary to be retransmitted according to the editing.

Figure 11:
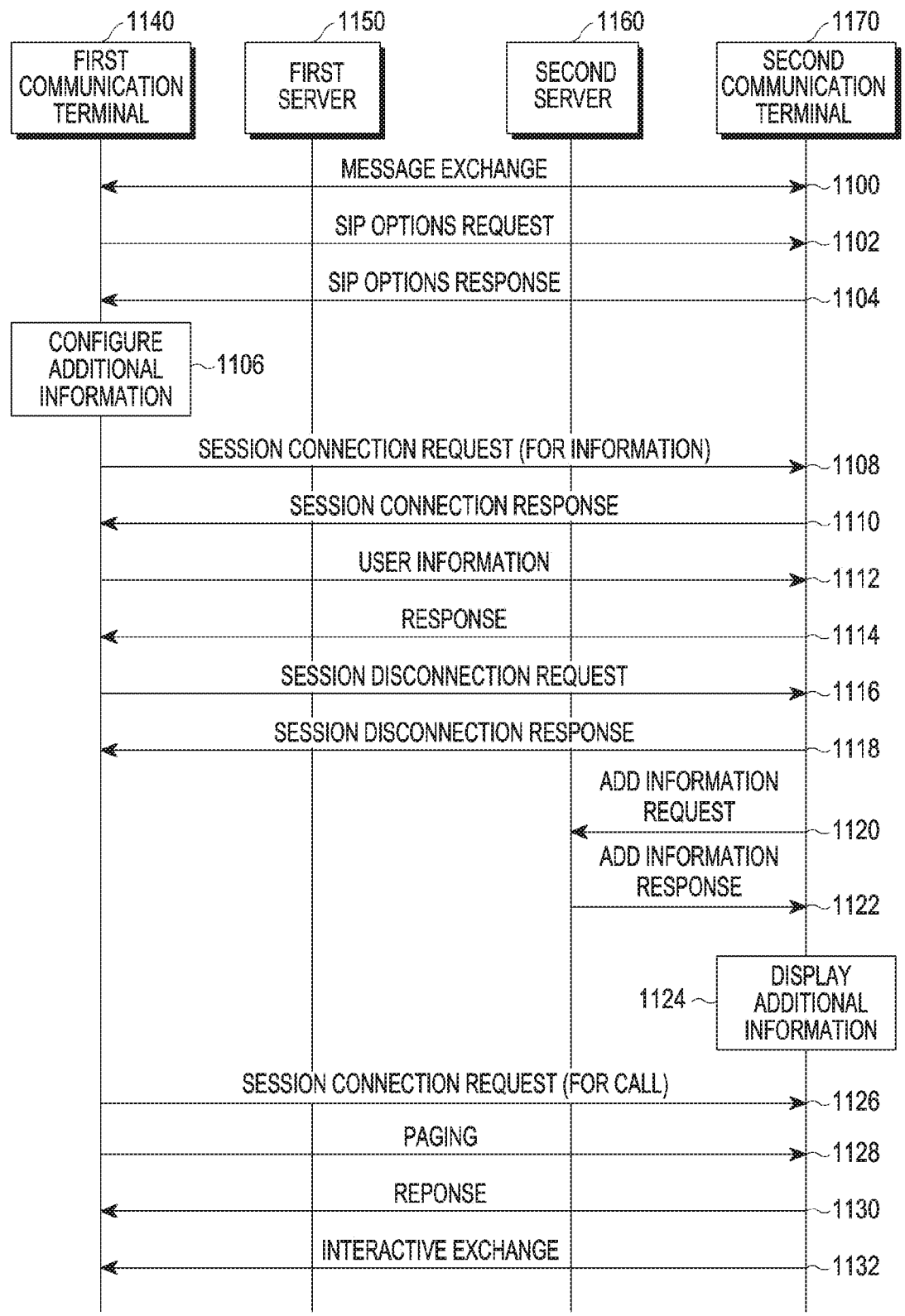
FIG. 11 is a diagram illustrating an example of a message-linked call procedure according to proposed various embodiments.

FIG. 11 is a diagram illustrating an example of a message-linked call procedure according to proposed various embodiments.

Referring to FIG. 11, a first communication terminal 1140 and a second communication terminal 1170 may mutually exchange a message, step 1100. The first communication terminal 1140 may transmit a message to the second communication terminal 1170 via a first server 1150 and a second server 1160. The second communication terminal 1170 may transmit a message to the first communication terminal 1140 via the second server 1160 and the first server 1150. The first communication terminal 1140 may record a message transmitted to the second communication terminal 1170 in a transmitted message storage box, and may record a message received from the second communication terminal 1170 in a received message storage box. The second communication terminal 1170 may record a message transmitted to the first communication terminal 1140 in a transmitted message storage box, and may record a message received from the first communication terminal 1140 in a received message storage box.

Messages transmitted by the first communication terminal 1140 and the second communication terminal 1170 may be a normal text message (SMS), a multimedia message (MMS), a voice message, a chatting message, or the like. In addition, the first communication terminal 1140 and the second communication terminal 1170 may correspond to information to be shared with a counterpart by a user, which includes webpage link information, an SNS message, a memo, a schedule, or the like.

The first communication terminal 1140 or the second communication terminal 1170 may receive information on whether an arrived message has been confirmed, which is provided from a counterpart communication terminal. The first communication terminal 1140 or the second communication terminal 1170 may identify whether the counterpart has confirmed the message transmitted by the first communication terminal 1140 or the second communication terminal 1170, on the basis of the information on whether the arrived message has been confirmed, which is provided from the counterpart communication terminal, and may store the same as a record. In addition, the first communication terminal 1140 or the second communication terminal 1170 may display through the screen whether the counterpart has confirmed the message transmitted by the first communication terminal 1140 or the second communication terminal 1170.

When a user requests a message-linked call, the first communication terminal 1140 needs to determine whether a message-linked call to the second communication terminal 1170 is possible. For example, a determination on whether the message-linked call is possible may be made by whether a "message-linked transmission mode" is activated as a call mode of the first communication terminal 1140 and by whether a "message-linked reception mode" is activated as a call mode of the second communication terminal 1170. The message-linked transmission mode and the message-linked reception mode may be set for each phone number registered in contact information or may be collectively set.

The first communication terminal 1140 transmits an SIP OPTIONS request to the second communication terminal 1170 via the first server 1150 and the second server 1160 in order to confirm whether the second communication terminal 1170 supports the message-linked reception mode, step 1102. As another example, it is also possible for the first communication terminal 1140 to transmit an SIP SUBSCRIBE request to the second communication terminal 1170 via the first server 1150 and the second server 1160 in order to confirm whether the second communication terminal 1170 supports the message-linked reception mode. Whether the second communication terminal supports the message-linked call (rich call) may be available through a service function tag (feature tag) defined by TABLE 1.

TABLE 1

| RCS service | Tag |
| --- | --- |
| Rich call | +g.3gpp.iari-ref="urn%3Aurn-7%3A3gpp-Application.ims.iariscs.ec |

Through a service function tag corresponding to an RCS service defined in TABLE 1, the first communication terminal 1140 and the second communication terminal 1170 use a message-linked call function. The message-linked call is not only a part of the RCS service, but also may be defined as a differentiated service of a specific business provider or a manufacturer (vendor). In this case, the service function tag may be determined by the specific business provider or the manufacturer.

TABLE 2 shown below defines the SIP OPTIONS request which is transmitted for the purpose of confirming by the first communication terminal 1140 through a service discovery whether the second communication terminal 1170 supports the message-linked reception mode.

TABLE 2

OPTIONS sip:rcsuser2@operatorB.net SIP/2.0
Via: SIP/2.0/UDP pcscf.operatorA.net;branch=z9hG4bK992kda9fd
Max-Forwards: 70
To: <sip:rcsuser2@operatorB.net>
From: <sip:rcsuser1.operatorA.net;user=phone>;tag=1928301774
Call-ID: a84b4c76e66710
CSeq: 1 OPTIONS
Accept-contact: *;+g.3gpp.iari-ref="urn%3Aurn-7%3A3gppapplication.ims.iari.rcs.ec"; . . .
Contact:<sip:rcsuser1.operatorA.net>;+g.3gpp.iari-ref="urn%3Aurn-7%3A3gppapplication.ims.iariscs.ec"; . . .
Accept: application/sdp
Content-Length: 0

Referring to TABLE 2, the second communication terminal 1170 may search for a message-linked call service through two headers existing within the SIP OPTIONS request for function (capability) confirmation.

Here, an "Accept-contact" header includes the service function tag, thereby enabling confirmation of whether the second communication terminal 1170 supports the message-linked call service. Further, a "Contact" header may display whether the first communication terminal 1140 supports the message-linked call service.

The second communication terminal 1170 may transmit, to the first communication terminal 1140, a response message (SIP OPTIONS RESPONSE) to the search for the message-linked call service, via the second server 1160 and the first server 1150, step 1104.

TABLE 3 shown below defines an example of a response message (SIP OPTIONS RESPONSE).

TABLE 3

SIP/2.0 200 OK
Via: SIP/2.0/UDP pcscf.operatorA.net;branch=z9hG4bK992kda9fd
To: <sip:rcsuser2@networkB.net>;tag=93810874
From: User1 <sip:rcsuser1@atlanta.com>;tag=1928301
Call-ID: a84b4c76e66710
CSeq: 63104 OPTIONS
Contact: <sip:rcsuser2@operatorB.net>; +g.3gpp.iari-ref="urn%3Aurn-7%3A3gpp-application.ims.iariscs.ec"

In TABLE 3, the second communication terminal 1170 may include, in the "Contact" header, its own SIP URI (sip:resuser2@operatorB.net) and the service function tag of the "Accept-contact" header in TABLE 2 in response to whether the message-linked call service is supported. In this case, notification is provided that the message-linked call service between the first communication terminal 1140 and the second communication terminal 1170 is possible.

The first communication terminal 1140 may configure additional information for the message-linked call in step 1106 when it is recognized that the second communication terminal 1170 supports the message-linked call.

For example, the first communication terminal 1140 may display a record (history) indicating that selecting a message is possible in addition to supporting the message-linked call. The first communication terminal 1140 may display the record of transmitted/received messages. The first communication terminal 1140 may select some or all of the displayed messages in response to a request of a caller. In addition, the first communication terminal 1140 may add user information to the additional information. The user information that can be added to the additional information may be an emoticon (an id, a name, a version, etc.), a call subject, a picture, a location, and the like.

In step 1108, the first communication terminal 1140 may transmit a session connection request (SIP INVITE) message to the second communication terminal 1170 via server A 1150 and server B 1160 in order to transfer the additional information to the second communication terminal 1170.

TABLE 4 shown below defines an example of a session connection request message for transferring additional information for the message-linked call.

TABLE 4

INVITE sip:alice@atlanta.com SIP/2.0
Via: SIP/2.0/UDP pc33.atlanta.com;branch=z9hG4bK776asdhds
Max-Forwards: 70
To: Alice <sip:alice@atlanta.com>

TABLE 4-continued

```
From: Bob <sip:RCS-UserB@networkB.net>;tag=1928301774
Call-ID: a84b4c76e66710
CSeq: 314159 INVITE
Contact: < sip:RCS-UserB@networkB.net >; >;+g.3gpp.iari-
ref="urn%3Aurn-7%3A3gppapplication.ims.iariscs.ec"
Allow:
INVITE,ACK,CANCEL,BYE,REFER,NOTIFY,UPDATE,OPTIONS,
SUBSCRIBE, MESSAGE
User-Agent:RCS-client/OMA2.0
Accept-Contact: *; >;+g.3gpp    . . . Rich Call Service tag.iari-
ref="urn%3Aurn-7%3A3gppapplication.
ims.iari.rcs.ec";
P-Preferred-Identity: <sip:RCS-UserB@networkB.net>
Supported: timer
Content-Type: application/sdp
Content-Length: XX
v=0    . . . Session Description for User Information Transfer
o=alice 3564365270 3564365270 IN IP4 49.56.85.241
s=-
c=IN IP4 49.56.85.241
t=0 0
m=message 3401 TCP/MSRP *
a=setup:active
a=sendonly
a=accept-types:*
a=path:msrp://12.11.3.1:3401/12121212;tcp
```

In TABLE 4, "Accept-contact" corresponds to information for confirming through inclusion of a service function tag whether a reception terminal supports a message-linked call service, "Contact" displays whether a transmission terminal supports the message-linked call service, and "Content-Type: application/s" corresponds to information relating to a session for transferring additional information including at least one of message-related information and emoticon-related information, for the message-linked call.

TABLE 5 shown below defines another example of a session connection request message for transferring additional information for the message-linked call.

TABLE 5

```
MSRP dkei38sd SEND
To-Path: msrp://RCSuserB.netowkrB.net:7777/iau39;tcp
From-Path: msrp://alicepc.example.com:8888/9di4ea;tcp
Message-ID: 07asdfge
Content-Type: multipart/mixed; boundary="boundary42"
--boundary42--
Content-Type: text/plain;charset=utf-8    . . . User information
(selected messages)
Message-ID: 456
Alice, what about tonight dinner?
12:30 PM read
--boundary42--
Content-Type: text/plain;charset=utf-8
Message-ID: 458
Let me check the schedule. call you gain.
12:33 PM read
--boundary42—
Content-Type: application/xml    . . . User information(emoticon
index)
Content-Length: XX
<?xml version="1.0" encoding="UTF-8"?>
<emot_img xmlns="urn:ietf:params:xml:ns:emot_img">
<emoticon>
<index>a1</index>
<name> smile_icon1.jpg</name>
<version>1.0</version>
<size>256<size>
<link>http://emot.con/abc123</link>
</emoticon>
<rcsrichcallinfo reason="establishment">    . . . User information
(extra-info)
<subject>Hi, Could we have a call now? </subject>
<location>
<name>my location</name>
```

TABLE 5-continued

```
<latitude>43.545240</latitude>
<longitude>1.387856</longitude>
<altitude>31.0</altitude>
<map-info><http://publicweb.networkB .net/users/sip:RCS-
UserB@networkB.net/mylocation>
</location>
</rcsrichcallinfo>
</emot_img>
--boundary42--
```

Detailed items in TABLE 5 may be defined as described below.

Accept-contact: confirm whether a reception terminal supports a message-linked call service, through inclusion of a service function tag Contact: indicate that a transmission terminal supports a message-linked call service Content-Type: application/sdp: information relating to a session for transferring additional information for a message-linked call file-selector: emoticon information to be transmitted name: file name type: file format size: size file-transfer-id: transmission id (preventing duplicate transmissions of a file)

file-disposition: file properties (render: directly rendering a file)

file-date:creation: file creation date

The second communication terminal 1170 may confirm the service function tag from the received session connection request message, and may automatically accept a session connection request for transferring additional information, on the basis of the confirmed service function tag. As another example, it may also be possible for the second communication terminal 1170 to automatically accept a session connection request for transferring additional information, through confirmation of a "User-Agent" header, a new header for a message-linked call, a relevant property value within a session body, or the like among header values of the received session connection request message.

In step 1110, the second communication terminal 1170 transmits a session connection response message on the basis of automatic reception to the first communication terminal 1140 via the second server 1160 and the first server 1150.

In step 1112, the first communication terminal 1140 transmits the additional information configured for the message-linked call to the second communication terminal 1170 via the first server 150 and the second server 160 by using a message session relay protocol message (MSRP SEND). The additional information may include a call subject, a picture, a location, etc. in addition to at least one of message-related information and emoticon-related information (an id, a name, a version, a size, a link, etc.).

TABLE 6 shown below shows an example of a message session relay protocol message (MSRP SEND) for transferring additional information including at least one selected message and emoticon identification information.

TABLE 6

```
INVITE sip:alice@atlanta.com SIP/2.0
Via: SIP/2.0/UDP pc33.atlanta.com;branch=z9hG4bK776asdhds
Max-Forwards: 70
To: Alice <sip:alice@atlanta.com>
From: Bob <sip:RCS-UserB@networkB.net>;tag=1928301774
Call-ID: a84b4c76e66710
CSeq: 314159 INVITE
Contact: < sip:RCS-UserB@networkB.net >; >;+g.3gpp.
iari-ref="urn%3Aurn-7%3A3gppapplication.ims.iari.rcs.ec"
Allow:
INVITE,ACK,CANCEL,BYE,REFER,NOTIFY,UPDATE,OPTIONS,SUBSCRIBE,
MESSAGE
User-Agent:RCS-client/OMA2.0
Accept-Contact: *; >;+g.3gpp  . . . Rich Call Service tag
.iari-ref="urn%3Aurn-7%3A3gppapplication.
ims.iari.rcs.ec";
P-Preferred-Identity: <sip:RCS-UserB@networkB.net>
Supported: timer
Content-Type: application/sdp
Content-Length: XX
v=0    . . . Session Description for User Information Transfer
o=alice 3564365270 3564365270 IN IP4 49.56.85.241
s=-
c=IN IP4 49.56.85.241
t=0 0
m=message 3401 TCP/MSRP *
a=setup:active
a=sendonly
a=accept-types:*
a=path:msrp://12.11.3.1:3401/12121212;tcp
a=file-selector:name:"emotic1.jpg" types:image/jpeg size:178
a=file-transfer-id:u8a9112jaheoAdjqoefg
a=file-disposition: render
a=file-date:creation:"Mon, 15 May 2015 15:01:31 +0300"
```

In TABLE 6, "Content-Type: text/plain;charset=utf-8" indicates a selected message configuring the additional information, "Message-ID" indicates identification information of the selected message, and "Content-Type: application/xml" indicates an emoticon, a call subject, etc., included in the additional information. Detailed items corresponding to "Content-Type: application/xml" may be as defined below.

<emot_img>: additional information, user information (an emoticon, a call subject, etc.)

<emoticon>: emoticon

<index>: index (id)

<name>: name

<Version>: version

<size>: size

<link>: emoticon link

<rcsrichcallinfo>: further user information (a call subject, a location, etc.)

Reason: purpose of transferring user information (establishment: transferring user information when connecting a call)

<subject>: call subject

<location>: location information

<name>: location name

<latitude>: latitude

<longitude>: longitude

<altitude>: altitude

<map-info>: location display-related map information

TABLE 7 shown below shows an example of a message session relay protocol message (MSRP SEND) for transferring additional information including at least one selected message and an emoticon.

TABLE 7

```
MSRP dkei38sd SEND
To-Path: msrp://RCSuserB.netowkrB.net:7777/iau39;tcp
From-Path: msrp://alicepc.example.com:8888/9di4ea;tcp
Message-ID: 07asdfge
Content-Type: multipart/mixed; boundary="boundary42"
--boundary42--
Content-Type: image/jpeg           ... User information(emoticon)
Content-Disposition: render; filename="smile_icon1.jpg";
creation-date="Mon, 15 May 2015 15:01:31 +0300"; size=178
... first set of bytes of the emoticon JPEG image ..(a picture file)
--boundary42--
Content-Type: text/plain;charset=utf-8     ... User information(selected
messages)
Message-ID: 456
Alice, what about tonight dinner?
12:30 PM read
--boundary42--
Content-Type: text/plain;charset=utf-8
Message-ID: 458
Let me check the schedule. call you gain.
12:33 PM read
--boundary42--
Content-Type: application/xml        ... User information(extran-info)
Content-Length: XX
<?xml version="1.0" encoding="UTF-8"?>
<rcsencapsule xmlns="urn:gsma:params:xml:ns:rcs:rcs:richcallinfo">
<rcsrichcallinfo reason="establishment">
<subject>Hi, Could we have a call now? </subject >
<location>
<name>my location</name>
<latitude>43.545240</latitude>
<longitude>1.387856</longitude>
<altitude>31.0</altitude>
<map-info><http://publicweb.netowrkB.net/users/sip:RCS-
UserB@networkB.net/mylocation>
</location>
</rcsrichcallinfo>
</rcsencapsule>
--boundary42—
```

In TABLE 7, detailed items may be defined as described below.

Content-Type: image/jpeg: additional information (a picture file)

Content-Type: text/plain;charset=utf-8: additional information (a selected message)

Message-ID: message ID

Content-Type: application/xml: further information (a call subject, a location, etc.)

<rcsrichcallinfo>: further information (a call subject, a location, etc.)

Reason: purpose of transferring additional information (establishment: transferring additional information when connecting a call)

<subject>: call subject
   <location>: location information
   <name>: location name
   <latitude>: latitude
   <longitude>: longitude
   <altitude>: altitude
   <map-info>: location display-related map information As another example, the message session relay protocol message (MSRP SEND) may include an emoticon and message identification information, or may include emoticon identification information and message identification information.

In step 1114, the second communication terminal 1170 confirms the received additional information and transmits a response signal (RESPONSE) in response thereto to the first communication terminal 1140 via the second server 1160 and the first server 1150.

In step 1116, the first communication terminal 1140 transmits a session release request message for requesting to release the session having been connected in order to transfer the additional information to the second communication terminal 1170 via the first server 1150 and the second server 1160.

After receiving the session release request message from the first communication terminal 1140, the second communication terminal 1170 transmits a session release response message to the first communication terminal 1140 via the second server 1160 and the first server 1150 in step 1118.

Procedures corresponding to the described steps 1108 to 1118 may be replaced with a procedure in which the first communication terminal 1140 transfers the session connection request message to the second communication terminal 1170. In this case, the session connection request message may include additional information.

After the session release request message is transmitted, the second communication terminal 1140 may confirm a group set for the transmission terminal 1140 from groups (category) in which registered phone numbers of the contact information are classified, and may distinguish information to be acquired from the server in consideration of the confirmed group.

Based on the result of the distinction, in step 1120, the second communication terminal 1170 may request the second server 1160 to provide further information as needed. The second server 1160 may provide further information requested by the second communication terminal 1170, in step 1122.

In step 1124, the second communication terminal 1170 may configure additional information to be displayed, that is display information, on the basis of the additional information received from the first communication terminal 1140 and the further information received as necessary from the second server 1160, and may display the configured display information on the screen. When desired information, e.g., an emoticon, etc., is absent, the second communication terminal 1170 may provide corresponding emoticon information through a set path and display the provided information on the screen.

In step 1126, the first communication terminal 1140 may transmit a session connection request message (SIP INVITE) for the message-linked call to the second communication terminal 1170 via the first server 1150 and the second server 1160.

In step 1128, the second communication terminal 1170 generates a call signal (paging) for the message-linked call, and may transmit the call signal to the first communication terminal 1140 via the second server 1160 and the first server 1150. In step 1130, the second communication terminal 120 may accept the message-linked call and may transmit a response signal in response to the acceptance to the first communication terminal 1140 via the second server 1160 and the first server 1150.

After the message-linked call is connected, in step 1132, the first communication terminal 1140 and the second communication terminal 1150 may perform message-linked communication on the basis of bidirectional communication. For example, the first communication terminal 1140 is capable of deactivating a message and a call subject displayed on the screen. It may be possible for the first communication terminal 1140 to perform new access and update through an input (e.g., a touch) in order to acquire specific information of a location displayed on a call connection screen.

In this case, it may be possible for the first communication terminal 1140 to share the new access and updated location information with the second communication terminal 1170. It may be possible to transfer newly updated information (e.g., a location, a webpage link, etc.) using an MSRP message through a previously established session. Further, the newly updated information may be transferred to the second communication terminal 1170 through separate message transmission, separately from the previously established session.

Figure 12:
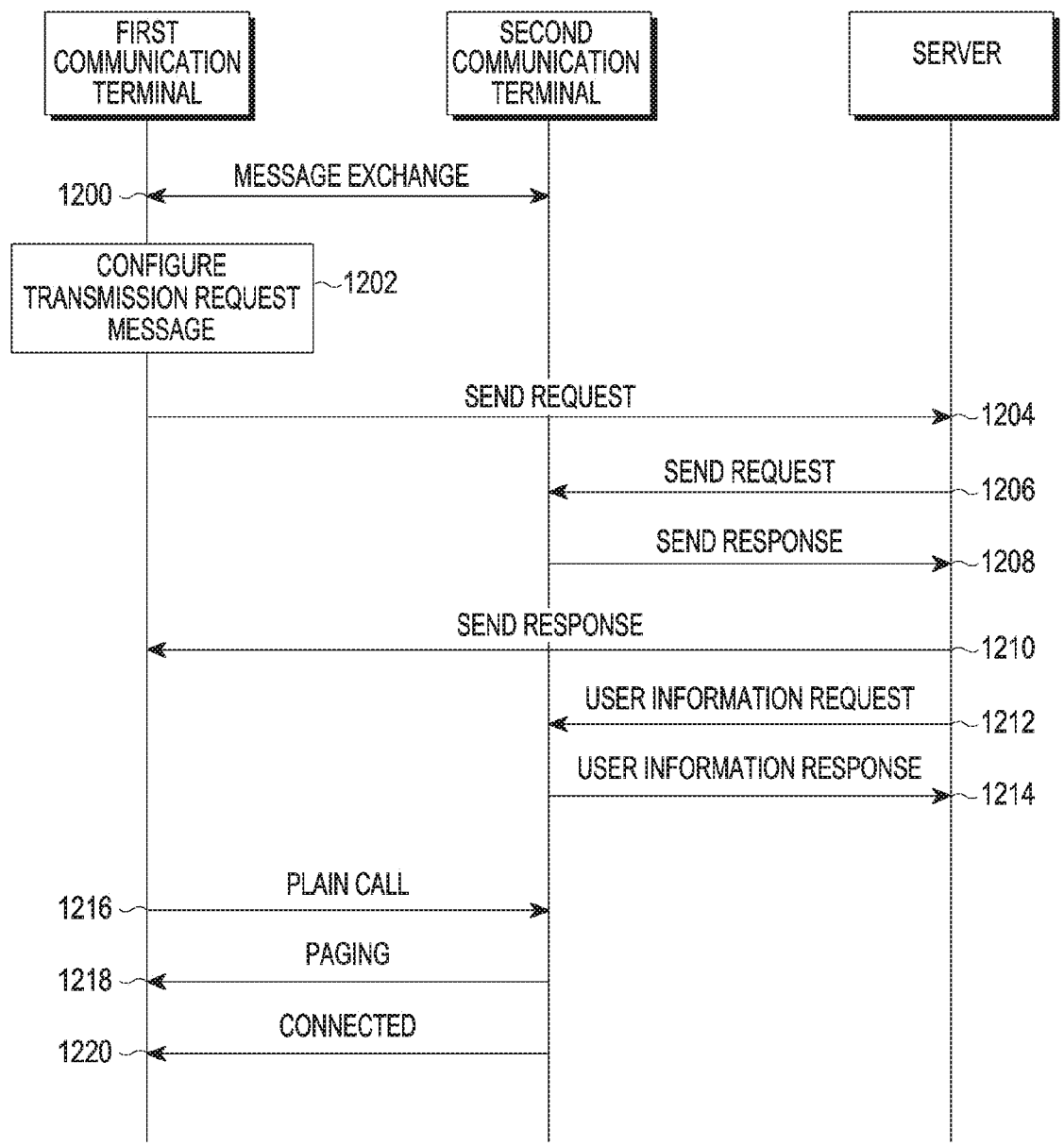
FIG. 12 is a diagram illustrating another example of a message-linked call procedure according to proposed various embodiments.

FIG. 12 is a diagram illustrating another example of a message-linked call procedure according to proposed various embodiments. The procedure illustrated in FIG. 12 corresponds to a procedure for enabling the second communication terminal to acquire additional information from a $3^{rd}$-party server.

The procedure proposed in FIG. 12 shows a difference in that a $3^{rd}$-party server performs a procedure (steps 1204 to 1210) for transferring additional information to the second communication terminal in response to a request of the first communication terminal, instead of the procedure (steps 1108 to 1118) in FIG. 11 in which a session for transferring additional information is connected and the first communication terminal 1140 transfers the additional information to the second communication terminal 1170 through the connected session. In addition, the procedure in FIG. 12 may be the same as that in FIG. 11.

Referring to FIG. 12, after message exchange with the second communication terminal 1170, the first communication terminal 1140 may configure a message for requesting transmission of additional information, steps 1200 and 1202. The message for requesting transmission may include emoticon-related information and information relating to a message for requesting the $3^{rd}$-party server to transfer additional information to the second communication terminal 1170.

TABLE 8 shows an example of a transmission request message.

TABLE 8

```
MESSAGE sip:user2@providerC.net SIP/2.0
Via: SIP/2.0/UDP user1.providerC.net;branch=z9hG4bK2akkakdi042a
Max-Forwards: 69
P-Preferred-Identity: "user1" sip:user1@providerC.net    . . . 3rd party
App.ID
P-Preferred-Service: urn:urn-7:3rdpartyapplication.
ims.iari.ecs.ec
From: <sip:user1@providerC.net>;tag=1234
To: <sip:user2@providerC.net>
CSeq: 1 MESSAGE
Accept-Contact:*;+g.providerC.instant_messaging;require;explicit
User-Agent: providerC-client/ECS;Andoroid_Phone;Device_type=
Andoroid_Phone;Net_Type=4G
Content-Type: multipart/mixed; boundary="boundary42"
--boundary42—
Content-Type: application/xml         . . . User information(emoticon,
index)
Content-Disposition: render
Content-Length: XX
<?xml version="1.0" encoding="UTF-8"?>
<emot_img xmlns="urn:ietf:params:xml:ns:emot_img">
<index>a1</index>
<name> smile_icon1.jpg</name>
<version>1.0</version>
<size>256<size>
<link>http://emot.con/abc123</link>
</emot_img>
--boundary42--
Content-Type: text/plain;charset=utf-8     . . . User information
(selected messages)
Message-ID: 456
Alice, what about tonight dinner?
12:30 PM read
--boundary42--
Content-Type: text/plain;charset=utf-8
Message-ID: 458
Let me check the schedule. call you gain.
12:33 PM read
--boundary42—
```

Detailed items in TABLE 8 may be defined as described below.

P-Preferred-Service: $3^{rd}$ party App. ID for transferring a corresponding selected message and an emoticon from a $3^{rd}$-party server for a message-linked call using a $3^{rd}$-party service, wherein the $3^{rd}$-party service is capable of transmitting a corresponding emoticon and a selected message to user B through the $3^{rd}$ party APP. ID transferred via a network (3G/LTE).

Accept-contact: confirm whether a message-linked call service using a $3^{rd}$-party service of a counterpart user is supported, through inclusion of a service function tag (+g.providerC.instant_messaging)

User-Agent: terminal Type (providerC-client)/support service name (ECS); device type (Android_Phone); network type (4G); $3^{rd}$ party emoticon call identifier (ecs.sam)

Content-Type: application/xml: additional information (a $3^{rd}$ party emoticon, etc.)

<emot_img>: additional information (a $3^{rd}$ party emoticon, a call subject, etc.)

<emoticon>: emoticon
<index>: index (id)
<name>: name
<Version>: version
<size>: size
<link>: emoticon link Content-Type: text/plain; charset=utf-8: additional information (a selected message)

Message-ID: message ID

The $3^{rd}$-party server proceeds emoticon call function confirmation, user authentication for an emoticon call, and emoticon call request authentication. For example, in order to confirm an emoticon call function, the $3^{rd}$-party server identifies, from a "P-Preferred-Service" header of a received transmission request message, that the first communication terminal 1140 has requested the $3^{rd}$-party server to transfer the selected message and emoticon-related information for a message-linked call using the $3^{rd}$-party service.

In addition, it may be recognized that a request for transferring additional information including a selected message and an emoticon to the second communication terminal is sent to the $3^{rd}$-party service server, through additional confirmation of the "Accept-Contact" header, the "User-Agent" header, the new header for transferring the additional information including the selected message and the emoticon by using the $3^{rd}$-party service, the type of the content in the body of the message, or the like among the header values of the received request in [TABLE 8].

Further, for user authentication for the message-linked call, it is confirmed whether the first communication terminal 1140 and the second communication terminal 1170 are terminals capable of transferring additional information including the selected message and the emoticon in order to make the message-linked call using the $3^{rd}$-party service.

Finally, for authenticating the message-linked call request, the $3^{rd}$-party server may perform authentication of whether the received transmission request message corresponds to a valid request conforming to the protocol specification.

In step 1206, the $3^{rd}$-party server transmits the transmission request message received from the first communication terminal 1140 to the second communication terminal 1170.

The second communication terminal 1170 confirms a function tag (+g.providerC.instant_messaging) corresponding to the message-linked call in the transmission request message for requesting the additional information including the selected message and the emoticon to be transferred using the $3^{rd}$-party service, and receives the transmission request message on the basis thereof. Further, it is possible for the second communication terminal 1170 to receive a request for transferring the additional information, through confirmation of a "P-Preferred-Service" header, a "User-Agent" header, a new header for the message-linked call using the $3^{rd}$-party service, the type of content in the body of a message, a property value, or the like among header values of the received transmission request message.

In step 1208, the second communication terminal 1170 may transmit a response signal to the $3^{rd}$-party server in response to the received transmission request message. In this case, the $3^{rd}$-party server transmits the response signal to the first communication terminal 1140 in step 1210.

Procedures thereafter may be defined to be the same as those described in FIG. 11, but show a difference in that a normal voice call is connected in steps 1216 to 1220.

Figure 13:
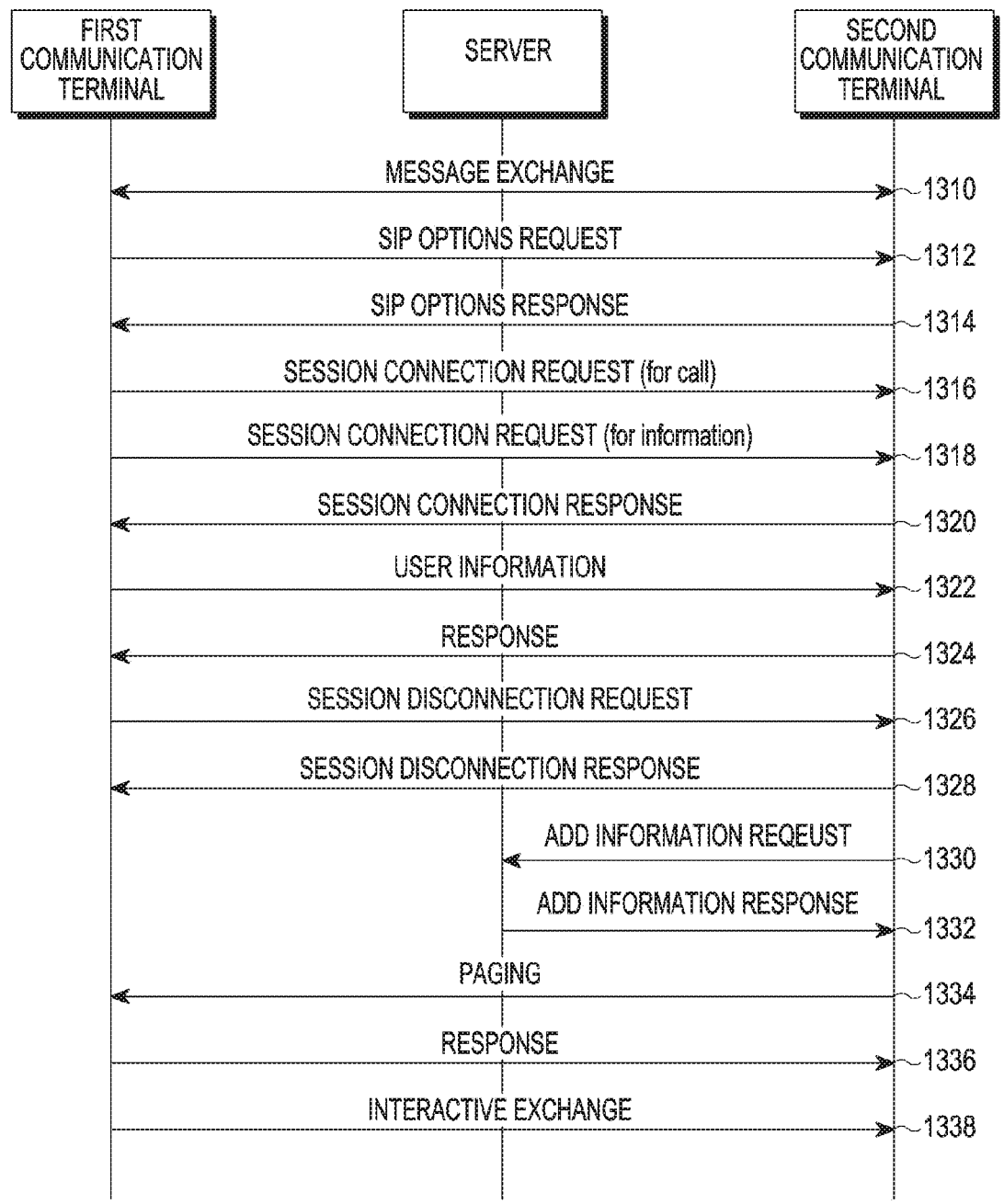
FIG. 13 is a diagram illustrating another example of a message-linked call procedure according to proposed various embodiments.

FIG. 13 is a diagram illustrating another example of a message-linked call procedure according to proposed various embodiments. It is assumed that the procedures illustrated in FIG. 13 are for consecutively requesting session connection for additional information and session connection for a message-linked call.

Therefore, the procedures defined in FIG. 13 nearly match the procedures defined in FIG. 11. However, in FIG. 11, the first communication terminal 1140 transfers additional information to the second communication terminal 1170 and then requests session connection for a message-linked call, while the first communication terminal 1140 requests, in step 1316, session connection for a message-linked call and then consecutively requests, in step 1318, session connection for transferring additional information in FIG. 13.

Although specific embodiments have been described in the detailed description of the present disclosure, it will be apparent to a person skilled in the art that various modifications and changes may be made thereto without departing from the scope of the various embodiments proposed in the present disclosure. Therefore, the scope of the present disclosure should not be defined as being limited to the aforementioned embodiments, but should be defined by the appended claims and equivalents thereof. In addition, such variant embodiments should not be understood separately from the technical idea or scope of the present disclosure.

What is claimed is:

1. A method for supporting a message-linked call by a terminal, the method comprising:
    transmitting, to a counterpart terminal, a request message inquiring about whether the counterpart terminal supports the message-linked call;
    receiving, from the counterpart terminal, a response message including a service function tag indicating that the counterpart terminal supports the message-linked call in response to the request message;
    determining that the counterpart terminal supports the message-linked call in response to identifying that the response message includes the service function tag;
    selecting at least one message to be used for the message-linked call from among messages that have been transmitted or received for an instant messaging service between the terminal and the counterpart terminal;
    configuring additional information for the message-linked call, wherein the additional information includes information relating to contents of the at least one selected message;
    transmitting a session connection request message for initiating the message-linked call including the additional information to the counterpart terminal; and
    performing the message-linked call with the counterpart terminal according to the transmitted additional information.

2. The method of claim 1,
    wherein the additional information further comprises information relating to an emoticon selected for the message-linked call and information relating to at least one among a call subject, a picture, a location, a media file, or an application file, and
    wherein the information relating to the emoticon corresponds to the emoticon selected for the message-linked call or identification information indicating the selected emoticon.

3. The method of claim 1, wherein the information relating to the contents of the at least one selected message includes identification information indicating the contents of the at least one selected message.

4. The method of claim 1, further comprising:
    storing the additional information into a call record according to the message-linked call.

5. A method for supporting a message-linked call by a terminal, the method comprising:
    receiving, from a counterpart terminal, a request message inquiring about whether the terminal supports the message-linked call;
    identifying whether the request message includes a service function tag indicating supporting of the message-linked call;
    transmitting, to the counterpart terminal, a response message including the service function tag in response to identifying the request message includes the service function tag;
    receiving, from the counterpart terminal, a session connection request message for initiating the message-linked call including additional information for the message-linked call, wherein the additional information includes information relating to contents of at least one message selected to be used for message-linked call from among messages that have been transmitted or received for an instant messaging service between the terminal and the counterpart terminal; and
    performing the message-linked call with the counterpart terminal according to the received additional information.

6. The method of claim 5,
    wherein the additional information further comprises information relating to an emoticon selected for the message-linked call and information relating to at least one among a call subject, a picture, a location, a media file, or an application file, and
    wherein the information relating to the emoticon corresponds to the emoticon selected for the message-linked call or identification information indicating the selected emoticon.

7. The method of claim 6, further comprising:
    determining that the information relating to the emoticon is identification information indicating the selected emoticon;
    extracting the emoticon corresponding to the identification information from among pre-stored emoticons;
    configuring display information based on the extracted emoticon; and
    displaying the configured display information.

8. The method of claim 5, wherein the information relating to the contents of the at least one message includes identification information indicating the at least one message.

9. The method of claim 8, further comprising:
    extracting the contents of the at least one message corresponding to the identification information from among messages which are stored;
    configuring display information based on the extracted contents of the at least one message; and
    displaying the configured display information.

10. The method of claim 5, further comprising:
    confirming an acceptance level that is set for the counterpart terminal;
    configuring display information corresponding to the confirmed acceptance level on the basis of the additional information; and
    displaying the configured display information,
    wherein the message-linked call is performed according to the displayed display information.

11. The method of claim 10, wherein configuring the display information comprises:
    identifying that a phone number assigned to the counterpart terminal is registered;
    confirming an acceptance level for classifying the identified phone number;
    extracting at least one piece of information corresponding to the confirmed acceptance level from the additional information; and
    configuring the display information to include at least the extracted at least one piece of information.

12. The method of claim 5, further comprising storing the received additional information into a call record according to the message-linked call.

13. A terminal for supporting a message-linked call, the terminal comprising:

a transceiver; and
a processor configured to:
  control the transceiver to transmit, to a counterpart terminal, a request message inquiring about whether the counterpart terminal supports the message-linked call,
  control the transceiver to receive, from the counterpart terminal, a response message including a service function tag indicating that the counterpart terminal supports the message-linked call in response to the request message,
  determine that the counterpart terminal supports the message-linked call in response to identifying that the response message includes the service function tag,
  select at least one message to be used for the message-linked call from among messages that have been transmitted or received for an instant messaging service between the terminal and the counterpart terminal,
  configure additional information for the message-linked call, wherein the additional information includes information relating to contents of the at least one selected message,
  control the transceiver to transmit a session connection request message for initiating the message-linked call including the additional information to the counterpart terminal, and
  perform the message-linked call with the counterpart terminal according to the transmitted additional information.

14. The terminal of claim 13, wherein the information relating to the contents of the at least one selected message includes identification information indicating the contents of the at least one selected message.

15. A terminal for supporting a voice call, the terminal comprising:
a transceiver; and
a processor configured to:
  control the transceiver to receive, from a counterpart terminal, a request message inquiring about whether the terminal supports the message-linked call,
  identify whether the request message includes a service function tag indicating supporting of the message-linked call,
  control the transceiver to transmit, to the counterpart terminal a response message including the service function tag in response to identifying the request message includes the service function tag,
  control the transceiver to receive, from the counterpart terminal, a session connection request message for initiating the message-linked call including additional information for the message-linked call, wherein the additional information includes information relating to contents of at least one message selected to be used for message-linked call from among messages that have been transmitted or received for an instant messaging service between the terminal and the counterpart terminal, and
  perform the message-linked call with the counterpart terminal according to the received additional information.

16. The terminal of claim 15, wherein the information relating to the contents of the at least one message includes identification information indicating the contents of the at least one selected message.

17. The terminal of claim 15, wherein the processor is further configured to store the received additional information into a call record according to the message-linked call.

* * * * *